(12) United States Patent
Kawanishi

(10) Patent No.: US 9,310,665 B2
(45) Date of Patent: Apr. 12, 2016

(54) IMAGE PICKUP APPARATUS, LENS UNIT AND CONTROL METHOD THEREFOR WHEREIN FOCUS DRIVING PREDICTION IS CALCULATED AND SENT FROM LENS UNIT TO CAMERA CONTROLLER

(71) Applicant: CANON KABUSHIKI KAISHA, Tokyo (JP)

(72) Inventor: Atsuya Kawanishi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 214 days.

(21) Appl. No.: 13/729,760

(22) Filed: Dec. 28, 2012

(65) Prior Publication Data

US 2013/0182171 A1 Jul. 18, 2013

(30) Foreign Application Priority Data

Jan. 13, 2012 (JP) .................................. 2012-004563
Dec. 18, 2012 (JP) .................................. 2012-276293

(51) Int. Cl.
G03B 3/10 (2006.01)
H04N 5/232 (2006.01)
G03B 7/14 (2006.01)
G03B 17/14 (2006.01)

(52) U.S. Cl.
CPC ........ *G03B 3/10* (2013.01); *G03B 17/14* (2013.01); *H04N 5/23209* (2013.01); *H04N 5/23212* (2013.01)

(58) Field of Classification Search
None
See application file for complete search history.

(56) References Cited

U.S. PATENT DOCUMENTS

| 2003/0048372 A1* | 3/2003 | Yasuda ................. G02B 7/102 348/349 |
| 2005/0185083 A1 | 8/2005 | Okawara |
| 2009/0245777 A1* | 10/2009 | Shibuno et al. ................ 396/104 |
| 2009/0245778 A1 | 10/2009 | Shibuno et al. |
| 2009/0256950 A1 | 10/2009 | Kawazoe et al. |
| 2010/0321516 A1* | 12/2010 | Kashiwagi ......... H04N 5/23241 348/222.1 |

(Continued)

FOREIGN PATENT DOCUMENTS

| CN | 102027737 A | 4/2011 |
| JP | 11-125860 | 5/1999 |
| JP | 2000-278587 A | 10/2000 |

(Continued)

OTHER PUBLICATIONS

Jun. 10, 2015 Chinese Office Action, which is enclosed with an English Translation, that issued in Chinese Patent Application No. 201210587623.4.

(Continued)

*Primary Examiner* — Shahbaz Nazrul
(74) *Attorney, Agent, or Firm* — Cowan, Liebowitz & Latman, P.C.

(57) ABSTRACT

The image pickup apparatus includes an image sensor operable to generate an image signal, and controller that controls communication with a mounted lens unit including an image taking optical system and generates a drive instruction to drive a focus lens of the mounted lens unit on a basis of a focus signal generated by using the image signal, the focus signal indicating a focus state of the image taking optical system. The controller sends information relating to a predetermined timing and the drive instruction to the lens unit, and receives, from the lens unit, a first signal indicating whether the focus lens is able to be moved by a movement based on the drive instruction to satisfy the predetermined timing.

27 Claims, 13 Drawing Sheets

(56) References Cited

U.S. PATENT DOCUMENTS

| | | | |
|---|---|---|---|
| 2011/0043678 A1 | 2/2011 | Ueda et al. | |
| 2011/0064397 A1* | 3/2011 | Shibuno et al. | 396/133 |
| 2011/0149133 A1* | 6/2011 | Kawanishi | 348/302 |
| 2011/0149141 A1 | 6/2011 | Yasuda | |
| 2011/0261251 A1* | 10/2011 | Okamoto et al. | 348/345 |
| 2012/0147255 A1* | 6/2012 | Yasuda | 348/352 |

FOREIGN PATENT DOCUMENTS

| | | |
|---|---|---|
| JP | 2009-139688 A | 6/2009 |
| JP | 2010-145450 A | 7/2010 |

OTHER PUBLICATIONS

European Search Report issued on Aug. 31, 2015, which is enclosed, that issued in the corresponding European Patent Application No. 12199645.8.

* cited by examiner

IMAGE PICKUP APPARATUS, LENS UNIT AND CONTROL METHOD THEREFOR WHEREIN FOCUS DRIVING PREDICTION IS CALCULATED AND SENT FROM LENS UNIT TO CAMERA CONTROLLER

BACKGROUND OF THE INVENTION

1. Field of the Invention

The present invention relates to a lens-interchangeable image pickup apparatus and a control method therefor.

2. Description of the Related Art

There is known a television auto-focus (TVAF) control method (hereinafter simply referred to as "TVAF control") which is a focus control method for image pickup apparatuses. The TVAF control produces a focus signal indicating the sharpness of an image signal produced by an image sensor that photoelectrically converts an object image. A focus lens is moved such that the focus signal reaches a maximum.

For the TVAF control, the relationship between the focus signal and position of the focus lens is extremely important. In particular, it is necessary, for a lens-interchangeable camera system in which an image pickup apparatus (camera body) produces the focus signal and a lens unit detachably attached to the camera body drives the focus lens, to appropriately manage the timing of the production of the focus signal and the drive of the focus lens.

Japanese Patent Laid-Open No. 2009-258718 discloses a method of setting the timings of a drive of the focus lens for TVAF control in a lens-interchangeable camera system.

However, in a lens-interchangeable camera system in which the camera body performs the TVAF control, since respective lens units attachable to the camera body have different optical characteristics, it is difficult to perform good TVAF control for all lens units.

SUMMARY OF THE INVENTION

The present invention provides an image pickup apparatus capable of performing good focus control regardless of an optical characteristic of a lens unit attached to the image pickup apparatus, and provides a lens unit allowing the image pickup apparatus to perform such good focus control.

The present invention provides as an aspect thereof an image pickup apparatus to which a lens unit provided with an image taking optical system including a focus lens is detachably mountable. The apparatus includes an image sensor operable to generate an image signal, and a controller configured to control communication with a mounted lens unit and to generate a drive instruction to drive the focus lens of the mounted lens unit on a basis of a focus signal generated by using the image signal, said focus signal indicating a focus state of the image taking optical system. The controller is configured to send information relating to a predetermined timing and the drive instruction to the lens unit, and receive, from the lens unit, a first signal indicating whether the focus lens is able to be moved by a movement based on the drive instruction to satisfy the predetermined timing.

The present invention provides as another aspect thereof a lens unit detachably mountable to an image pickup apparatus having an image sensor operable to generate an image signal. The lens unit includes an image taking optical system including a focus lens, and a lens controller configured to receive a drive instruction for the focus lens from the image pickup apparatus and to control drive of the focus lens on a basis of the drive instruction. The lens controller is configured to receive information relating to a predetermined timing and the drive instruction from the image pickup apparatus, and send, to the image pickup apparatus, a first signal indicating whether the focus lens is able to be moved by a movement based on the driving instruction to satisfy the predetermined timing.

The present invention provides as still another aspect thereof a lens unit detachably mountable to an image pickup apparatus having an image sensor operable to generate an image signal. The lens unit includes an image taking optical system including a focus lens, and a lens controller configured to receive a drive instruction for the focus lens from the image pickup apparatus and to control drive of the focus lens on a basis of the drive instruction. The lens controller is configured to receive information relating to a predetermined timing and the drive instruction from the image pickup apparatus, and then send, to the image pickup apparatus, a signal of a predetermined level as a first signal when the focus lens is not able to be moved by a movement based on the driving instruction to satisfy the predetermined timing, and set a longer stopping time period to stop the focus lens after completion of its movement based on the drive instruction, when sending to the image pickup apparatus the signal of the predetermined level as the first signal, as compared with when sending thereto a signal of a level different from the predetermined level as the first signal.

The present invention provides as yet still another aspect thereof a lens unit detachably mountable to an image pickup apparatus having an image sensor operable to generate an image signal. The lens unit includes an image taking optical system including a focus lens, and a lens controller operable to communicate with the image pickup apparatus in synchronization with a vertical synchronizing signal and configured to receive a drive instruction of the focus lens and to control drive of the focus lens on a basis of the drive instruction. The lens controller is further configured to perform a first communication in synchronization with the vertical synchronizing signal and then perform a second communication before a next first communication in synchronization with a next vertical synchronizing signal, receive in the second communication the information relating to the predetermined timing and the drive instruction from the image pickup apparatus, and send in the next first communication, in a case that the focus lens is not able to be moved by the movement based on the drive instruction to satisfy the predetermined timing, a signal of a predetermined level as a first signal to the image pickup apparatus. The lens controller sets a longer stopping time period to stop the focus lens after completion of its movement based on the drive instruction when sending to the image pickup apparatus the signal of the predetermined level as the first signal, as compared with when sending thereto a signal of a level different from the predetermined level as the first signal.

The present invention provides as further another aspect thereof a method of controlling an image pickup apparatus to which a lens unit provided with an image taking optical system including a focus lens is detachably mountable and which is provided with an image sensor operable to generate an image signal. The method including a controlling step of controlling communication with a mounted lens unit, a focus signal generating step of generating a focus signal indicating a focus state of the image taking optical system by using the image signal, and a drive instruction generating step of generating a drive instruction for the focus lens on a basis of the focus signal. In the controlling step, the method sends information relating to a predetermined timing and the drive instruction to the lens unit and receives, from the lens unit, a first signal indicating whether the focus lens is able to be moved by a movement based on the drive instruction to satisfy the predetermined timing.

The present invention provides as still further another aspect thereof a method of controlling a lens unit provided with an image taking optical system including a focus lens and detachably mountable to an image pickup apparatus having an image sensor operable to generate an image signal. The method includes a receiving step of receiving a drive instruction for the focus lens from the image pickup apparatus, a sending step of sending information to the image pickup apparatus, and a controlling step of controlling drive of the focus lens on a basis of the drive instruction. In the receiving step, the method receives information relating to a predetermined timing and the drive instruction from the image pickup apparatus, and a in the sending step, the method sends, to the image pickup apparatus, a first signal indicating whether the focus lens is able to be moved by a movement based on the driving instruction to satisfy the predetermined timing.

The present invention provides as yet further another aspect thereof a method of controlling a lens unit provided with an image taking optical system including a focus lens and detachably mountable to an image pickup apparatus having an image sensor operable to generate an image signal. The method includes a receiving step of receiving a drive instruction for the focus lens from the image pickup apparatus; a sending step of sending information to the image pickup apparatus, and a controlling step of controlling drive of the focus lens on a basis of the drive instruction. In the receiving step, the method receives information relating to a predetermined timing and the drive instruction from the image pickup apparatus, and in the sending step, the method sends, to the image pickup apparatus, a signal of a predetermined level as a first signal when the focus lens is not able to be moved by a movement based on the driving instruction to satisfy the predetermined timing. In the controlling step, the method sets a longer stopping time period to stop the focus lens after completion of its movement based on the drive instruction when sending to the image pickup apparatus the signal of the predetermined level as the first signal, as compared with when sending thereto a signal of a level different from the predetermined level as the first signal.

The present invention provides as yet still further another aspect thereof a method of controlling a lens unit provided with an image taking optical system including a focus lens and detachably mountable to an image pickup apparatus having an image sensor operable to generate an image signal. The method includes a receiving step of receiving a drive instruction for the focus lens from the image pickup apparatus, a sending step of sending information to the image pickup apparatus, and a controlling step of controlling drive of the focus lens on a basis of the drive instruction. The method performs a first communication in synchronization with a vertical synchronizing signal and then performing a second communication before a next first communication in synchronization with a next vertical synchronizing signal. In the receiving step, the method receives in the second communication the information relating to a predetermined timing and the drive instruction from the image pickup apparatus. In the sending step, the method sends, when the focus lens is not able to be moved by the movement based on the driving instruction to satisfy the predetermined timing, a signal of a predetermined level as a first signal to the image pickup apparatus in the next first communication. In the controlling step, the method sets a longer stopping time period to stop the focus lens after completion of its movement based on the drive instruction when sending to the image pickup apparatus the signal of the predetermined level as the first signal, as compared with when sending thereto a signal of a level different from the predetermined level as the first signal.

The present invention provides as further another aspect thereof a non-transitory machine readable medium containing program code which upon execution causes an image pickup apparatus to which a lens unit provided with an image taking optical system including a focus lens is detachably mountable and which is provided with an image sensor operable to generate an image signal, to perform a focus signal generating step of generating a focus signal indicating a focus state of the image taking optical system by using the image signal, and a drive instruction generating step of generating a drive instruction for the focus lens on a basis of the focus signal, and a controlling step of controlling communication with the lens unit comprising sending information relating to a predetermined timing and the drive instruction to the lens unit and receiving, from the lens unit, a first signal indicating whether the focus lens is able to be moved by a movement amount based on the drive instruction to satisfy the predetermined timing.

The present invention provides as still further another aspect thereof a non-transitory machine readable medium containing computer executable program code which upon execution causes a lens unit provided with an image taking optical system including a focus lens and detachably mountable to an image pickup apparatus having an image sensor operable to generate an image signal, to perform a receiving step of receiving a predetermined timing and a drive instruction for the focus lens from the image pickup apparatus, a controlling step of controlling drive of the focus lens on a basis of the drive instruction, and a sending step of sending, to the image pickup apparatus, a first signal showing whether or not the focus lens is able to be moved by a movement based on the driving instruction to satisfy the predetermined timing.

Further features of the present invention will become apparent from the following description of exemplary embodiments with reference to the attached drawings.

DESCRIPTION OF THE PREFERRED EMBODIMENTS

Embodiments of the present invention will hereinafter be described with reference to the accompanying drawings.

Embodiment 1

In a lens-interchangeable camera system of a first embodiment (Embodiment 1) of the present invention, an image pickup apparatus sends, to a lens unit including a focus lens, a drive start timing and an arrival determination criterion timing for the focus lens that serves as a criterion for determining whether or not the focus lens is able to arrive at a target position before the arrival determination criterion timing. The lens unit returns, to the image pickup apparatus, a result of arrival prediction. Sending (and returning) thereof enables focus control with management of control timings of the image pickup apparatus and the lens unit.

Figure 1:
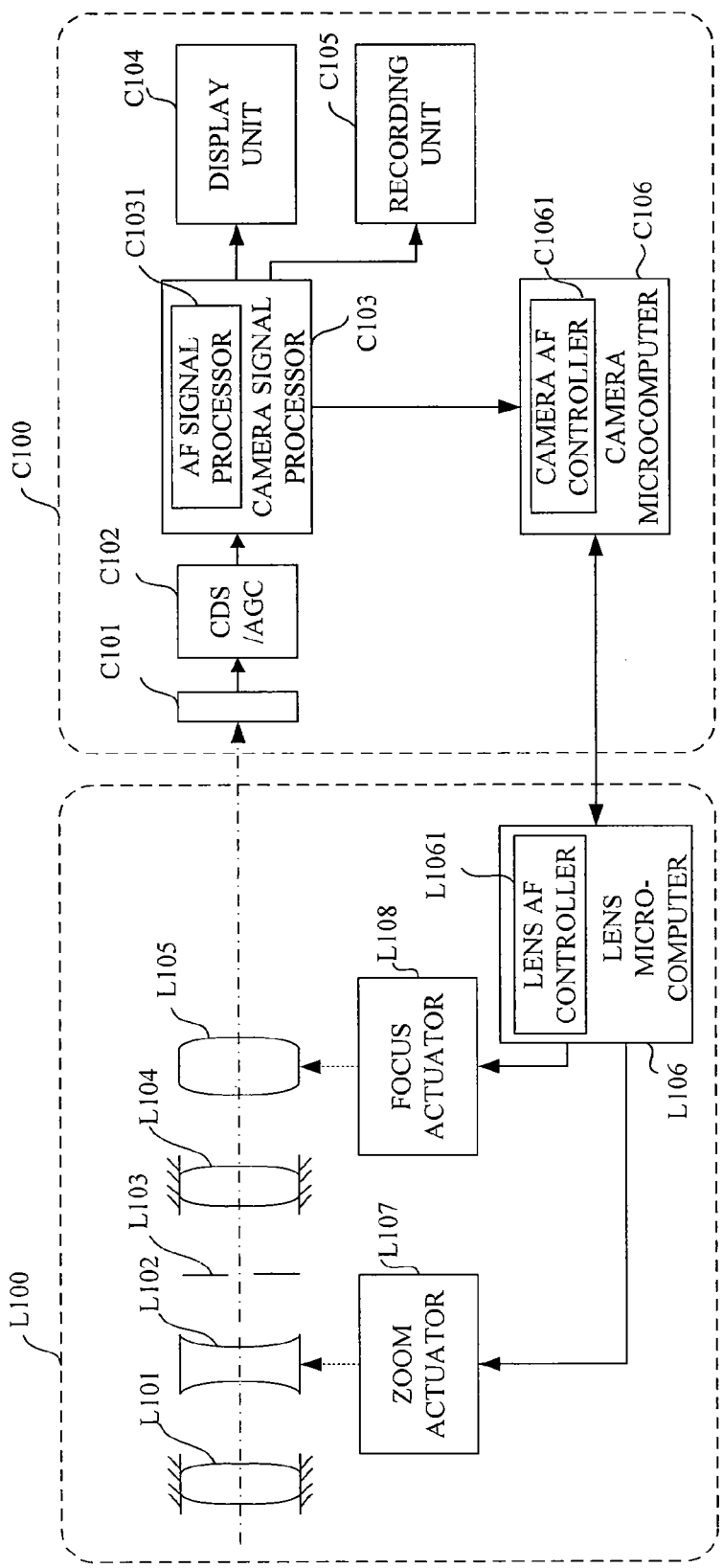
FIG. 1 is a block diagram showing a configuration of a lens-interchangeable camera system that is Embodiment 1 of the present invention.

FIG. 1 shows a configuration of the lens-interchangeable camera system of Embodiment 1. A lens unit L100 is an interchangeable lens detachably attachable to a camera body C100 which is an image pickup apparatus.

Light from an object passes through an image taking optical system in the lens unit L100 to form an object image on an image sensor C101 in the camera body C100. The image taking optical system is constituted by, in order from an object side, a first fixed lens L101 that is fixed in position in the lens unit L100, a magnification-varying lens L102 that is movable in an optical axis direction to perform variation of magnification, an aperture stop L103 that controls quantity of light, a second fixed lens L104 that is fixed in position in the lens unit L100, and a focus lens L105 that has a function of correcting variation of an image plane (image plane variation) caused by the variation of magnification and also a focusing function.

Although FIG. 1 shows each lens as if it is constituted by one lens element, each lens may actually be constituted by one or more lens elements that together provide the desired optical properties of the lens.

In the camera body C100, the image sensor C101 is constituted of a photoelectric conversion element such as a CCD sensor or a CMOS sensor. The image sensor C101 performs charge accumulation in synchronization with a vertical synchronizing signal, thereby photoelectrically converting the object image to output an analog signal as an image signal. The image sensor C101 may be provided to each of three primary colors such as red (R), blue (B) and green (G).

A CDS/AGC/AD converter C102 samples output of the image sensor C101 and then performs gain adjustment and digital conversion thereon. A camera signal processor C103 performs various image processes on an output signal from the CDS/AGC/AD converter C102 to produce an image.

An AF signal processor C1031 in the camera signal processor C103 extracts a high frequency component, a luminance difference component produced from the high frequency component or the like from output signals from the CDS/AGC/AD converter C102 corresponding to a pixel area used for focus detection out of an entire pixel area of the image sensor C101, to produce (generate) a focus signal. The focus signal is also called a contrast evaluation value signal and shows sharpness (contrast state) of an image signal from the image sensor C101. The sharpness is changed depending on the focus state of the image taking optical system, which results in that the focus signal shows the focus state of the image taking optical system. The AF signal processor C1031 corresponds to a focus signal producer (generator).

A display unit C104 displays the image from the camera signal processor C103. A recording unit C105 records the image from the camera signal processor C103 to a recording medium such as a magnetic tape, an optical disk or a semiconductor memory. A camera microcomputer C106 functions as an image pickup apparatus controller to control a focus actuator L108 in the lens unit L100 on a basis of output from the camera signal processor C103 to move the focus lens L105 in the optical axis direction. This operation is mainly performed by a camera AF controller C1061 provided in the camera microcomputer C106. A detailed description of the operation of the camera AF controller C1061 will be made later.

In the lens unit L100, a lens microcomputer L106 as a lens controller is operable to communicate information with (send and receive information to and from) the camera microcomputer C106.

In this embodiment, the camera microcomputer C106 and the lens microcomputer L106 perform communication of fixed length packets (hereinafter referred to as "fixed length packet communication") at timings in synchronization with vertical synchronizing signals. There is, as the fixed length packet communication, a first communication that includes transmission of information on a focus lens position from the lens microcomputer L106 to the camera microcomputer C106, the above-mentioned result of the arrival prediction (described later in detail) and the like. Moreover, there is also included, as part of the fixed length packet communication, a second communication that includes focus control instructions such as a target defocus amount from the camera microcomputer C106 to the lens microcomputer L106. Each of the first communication and the second communication is performed between the camera microcomputer C106 and the lens microcomputer L106 once in one vertical synchronizing period.

The lens microcomputer L106 includes a lens AF controller L1061. The lens AF controller L1061 performs focus control according to a target position of the focus lens L105 decided by the camera AF controller C1061. Moreover, the lens AF controller L1061 performs, in the variation of magnification, zoom tracking control that moves the focus lens L105 on a basis of zoom tracking data (zoom tracking cam) stored in the lens microcomputer L106. The zoom tracking control prevents the image plane variation (image blur) with the variation of magnification. The lens microcomputer L106 stores data of focus sensitivity showing a relationship between movement amounts of the focus lens L105 (focus movement amounts) and change amounts of the focus state (defocus change amounts) on the image plane.

A zoom actuator L107 moves the magnification-varying lens L102. The focus actuator L108 moves the focus lens L105. The zoom actuator L107 and the focus actuator L108 are respectively constituted by a stepping motor, a DC motor, a vibration type motor or a voice coil motor.

Next, description will be made of outline of the focus control (TVAF control) performed by the lens microcomputer L106 and the camera microcomputer C106 with reference to FIG. 3.

Figure 3:
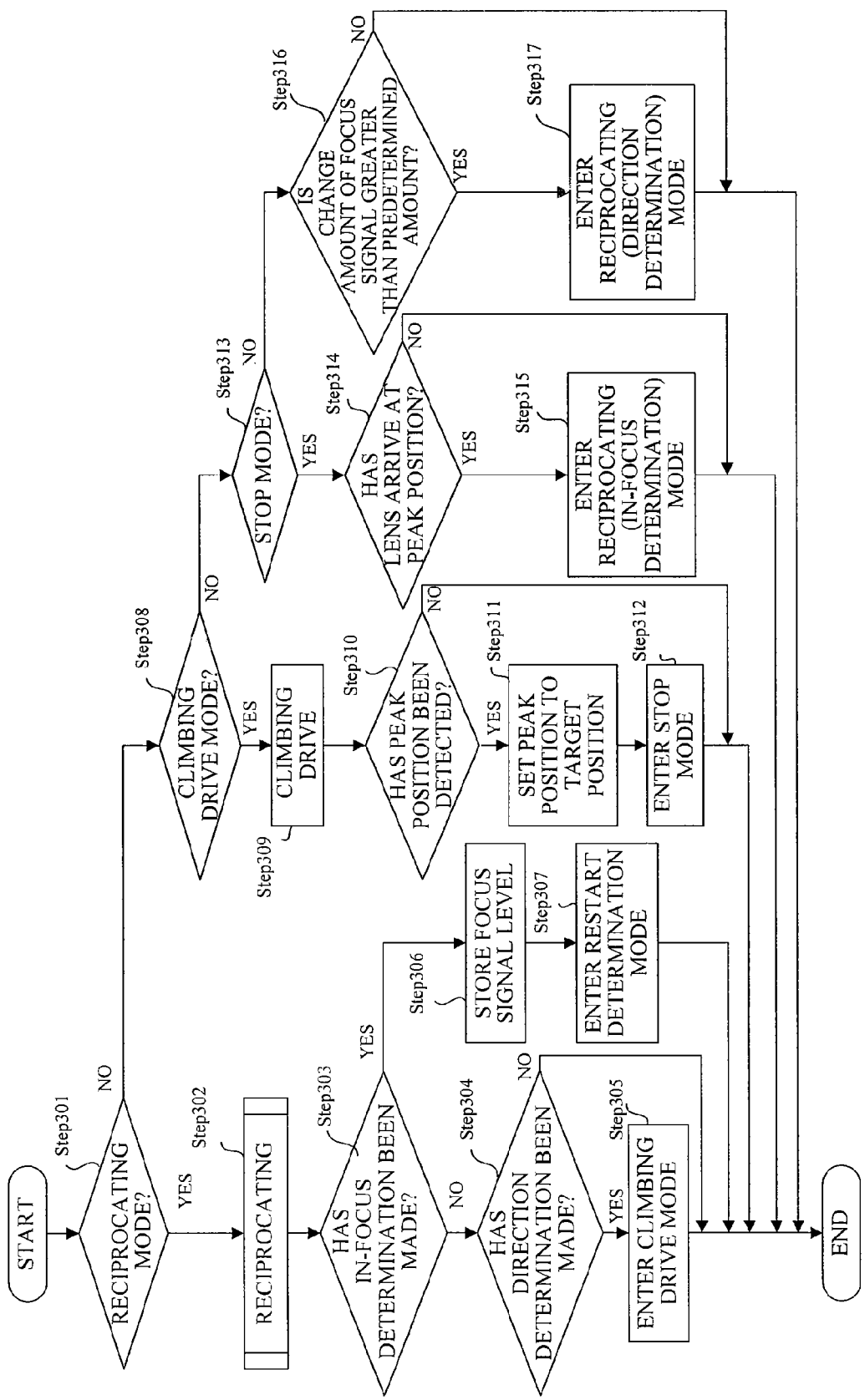
FIG. 3 is a flowchart of TVAF control in Embodiment 1.

FIG. 3 is a flowchart showing an overall flow of the TVAF control. Processes here are mainly performed by the camera AF controller C1061 in the camera microcomputer C106 according to a computer program. This also applies to other embodiments described later.

The camera microcomputer C106 manages drive and position of the focus lens L105 through communication with the lens microcomputer L106.

In FIG. 3, at step 301, the camera microcomputer C106 (camera AF controller C1061) determines whether or not a current TVAF mode is a reciprocating mode (wobbling mode). If the current TVAF mode is the reciprocating mode, the camera microcomputer C106 proceeds to step 302, and if not, it proceeds to step 308.

At step 302, the camera microcomputer C106 performs a reciprocating operation to minutely drive the focus lens L105 in a reciprocating manner with predetermined amplitude, and determines whether or not an in-focus state is obtained and in which direction (i.e. near or far) an in-focus position of the focus lens L105 exists in. Detailed operations here will be described later with reference to FIGS. 4 and 5.

At step 303, the camera microcomputer C106 determines whether or not the focus lens L105 has been reciprocated a predetermined number of times in a same area from a history of positions of the focus lens L105 in the reciprocating operation at step 302. If so, the camera microcomputer C106 determines that the in-focus state is obtained (that is, in-focus determination is made) and proceeds to step 306. If not, the camera microcomputer C106 determines that the in-focus state is not obtained and proceeds to step 304.

At step 304, the camera microcomputer C106 determines whether or not determinations that the in-focus position exists in a same direction have been consecutively made a predetermined number of times from the history of the positions of the focus lens L105 in the reciprocating operation at step 302. If so, the camera microcomputer C106 determines that an in-focus direction determination (hereinafter simply referred to as "direction determination") has been made and then proceeds to step 305 to enter a peak-climbing drive mode (mountain-climbing drive mode). If not, the camera microcomputer C106 determines that the direction determination has not been made and then returns to step 301 to continue the reciprocating mode.

At step 306, the camera microcomputer C106 stores a level of the focus signal (hereinafter referred to as "a focus signal level") in the in-focus state to a memory (not shown) and then proceeds to step 307 to enter a restart determination mode (steps 316 and 317). The restart determination mode determines whether or not to perform the reciprocating operation (that is, the direction determination) again.

At step 308, the camera microcomputer C106 determines whether or not the current TVAF mode is the peak-climbing drive mode. If the current TVAF mode is the peak-climbing drive mode, the camera microcomputer C106 proceeds to step 309, and if not, it proceeds to step 313.

At step 309, the camera microcomputer C106 performs a peak-climbing drive operation to drive the focus lens L105, in a direction in which (value of) the focus signal is increased, at a predetermined speed. This embodiment omits a detailed description of the peak-climbing drive operation.

At step 310, the camera microcomputer C106 determines whether or not a position (hereinafter referred to as "a peak position") of the focus lens L105 where the focus signal becomes a maximum value (that is, a value showing an in-focus state of the image taking optical system) by the peak-climbing drive operation at step 309 has been detected. If the peak position has been detected, the camera microcomputer C106 proceeds to step 311, and if not, it returns to step 301. When the determination that the peak position has been detected is made at step 310, the camera microcomputer C106 moves the focus lens L105 to the peak position and then enters an in-focus determination mode (step 315).

At step 311, the camera microcomputer C106 sets the peak position to a target position of the focus lens L105. Thereafter, the camera microcomputer C106 proceeds to step 312 to enter a stop mode.

At step 313, the camera microcomputer C106 determines whether or not the current TVAF mode is the stop mode. If the current TVAF mode is the stop mode, the camera microcomputer C106 proceeds to step 314, and if not, it proceeds to step 316.

At step 314, the camera microcomputer C106 determines whether or not the focus lens L105 has been returned to the peak position. If the focus lens L105 has been returned to the peak position, the camera microcomputer C106 proceeds to step 315 to enter the reciprocating (in-focus determination) mode, and if not, it returns to step 301 to continue the stop mode.

At step 316, the camera microcomputer C106 compares a current focus signal level with the previous focus signal level stored at step 306 to determine whether or not a change amount therebetween is greater than a predetermined value. If the change amount is greater than the predetermined value, the camera microcomputer C106 proceeds to step 317 to enter the reciprocating (direction determination) mode, and if not, it returns to step 301 to continue the restart determination mode.

Next, description will be made of control performed by the camera microcomputer C106 and the lens microcomputer L106 in the reciprocating operation at step 302 with reference to FIGS. 10A, 10B and 11.

Figure 10A:
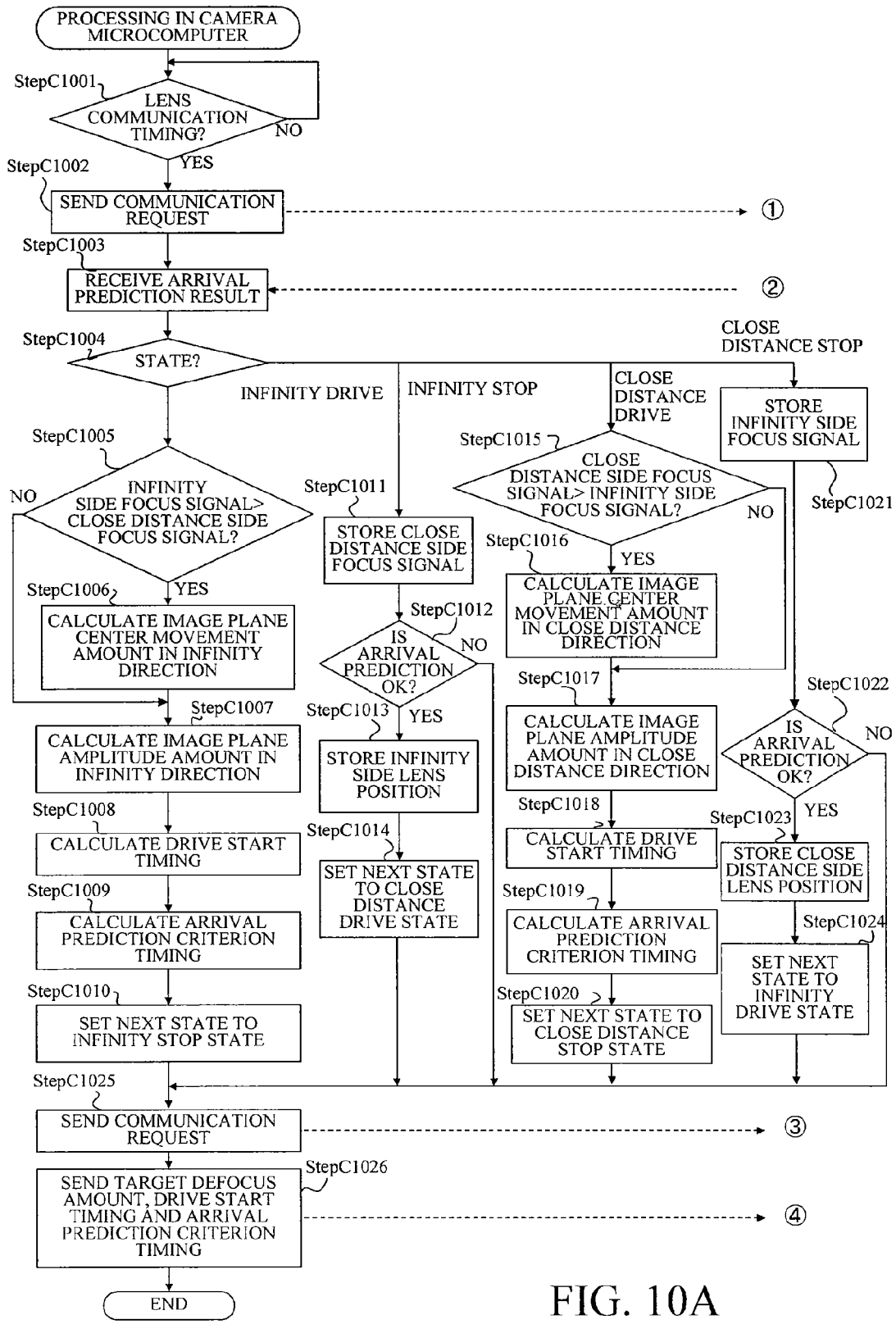
FIGS. 10A and 10B are flowcharts showing the TVAF control in Embodiment 1.
Figure 10B:
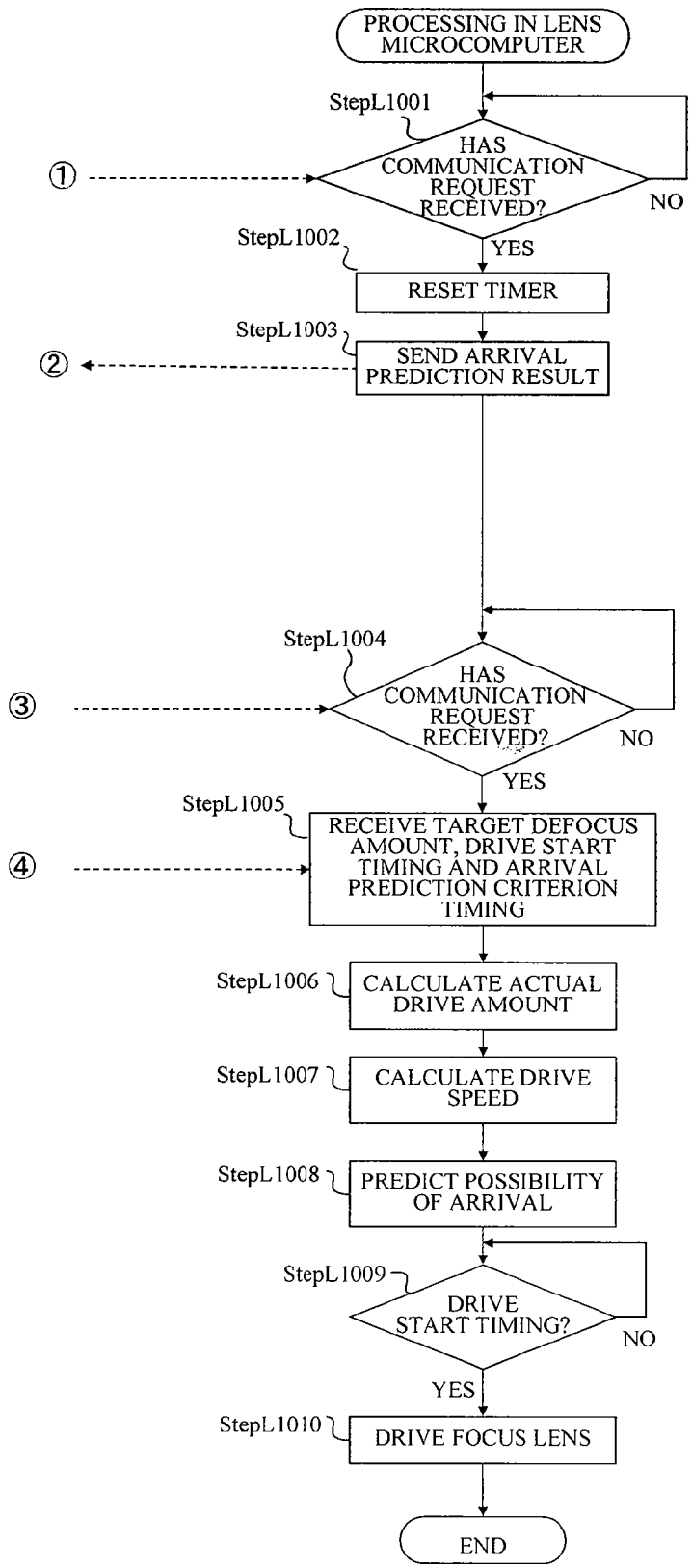

In FIGS. 10A and 10B, at step C1001, the camera microcomputer C106 determines whether or not a current timing with respect to the vertical synchronizing signal of the image coincides with a predetermined timing at which the communication with the lens microcomputer L106 (hereinafter referred to as "lens communication") is performed. If the current timing coincides with the predetermined timing (lens communication timing), the camera microcomputer C106 proceeds to step C1002, and if not, it returns to step C1001 to wait for the predetermined timing. This lens communication timing may be arbitrarily set on a basis of a start timing of charge accumulation in the image sensor C101 for producing the image signal, as long as a delay time of the lens communication timing with respect to the vertical synchronizing signal is kept constant.

At step C1002, the camera microcomputer C106 sends a communication request to the lens microcomputer L106 to start the lens communication.

At step L1001, the lens microcomputer L106 determines whether or not it has received the communication request sent from the camera microcomputer C106 at step C1002. If having received the communication request, the lens microcomputer L106 proceeds to step L1002, and if not, it returns to step L1001.

At step L1002, the lens microcomputer L106 resets its internal timer in response to start of the first communication, and then measures a delay time from the start of the first communication.

At step L1003, the lens microcomputer L106 sends a result of the arrival prediction calculated in a previous process to the camera microcomputer C106. The communication here corresponds to part of the first communication. A detailed description of the arrival prediction will be made at step L1008 later.

Next, at step C1003, the camera microcomputer C106 receives the result of the arrival prediction sent from the lens microcomputer L106 by the first communication at step L1003. In an example of FIG. 11, when a current vertical synchronizing signal (VD) is VD (4), this denotes a process corresponding to receiving timing of the arrival prediction (4).

At step C1004, the camera microcomputer C106 determines which one of an infinity drive state, an infinity stop state, a close distance drive state and a close distance stop state is a current control state. If the current control state is the infinity drive state, the camera microcomputer C106 proceeds to step C1005, and if the current control state is the infinity stop state, it proceeds to step C1011. If the current control state is the close distance drive state, it proceeds to step C1015. And, if the current control state is the close distance stop state, it proceeds to step C1021.

At step C1005, the camera microcomputer C106 compares a level of an infinity side focus signal that has been stored at previous step C1021 with that of a close distance side focus signal that has been stored at previous step C1011. If the infinity side focus signal level is greater than the close distance side focus signal level, the camera microcomputer C106 proceeds to step C1006, and if not, it proceeds to step C1007. In the example of FIG. 11, when the current VD is a VD (7), the camera microcomputer C106 compares a level of a focus signal (4) with that of a focus signal (2).

At step C1006, the camera microcomputer C106 calculates, as a defocus amount on an image pickup surface of the image sensor C101 (hereinafter referred to as "an image sensor surface"), an image plane center movement amount that is a movement amount of a driving center position of the focus lens L105 in an infinity direction. This defocus amount is set within a depth of focus, on a basis of a permissible circle of confusion and an F-number acquired from the lens microcomputer L106.

At step C1007, the camera microcomputer C106 calculates as a defocus amount on the image sensor surface, an image plane amplitude amount that is a movement amount of the focus lens L105 in the infinity direction with respect to the driving center position. This defocus amount is also set within the depth of focus, as well as the image plane center movement amount.

At step C1008, the camera microcomputer C106 calculates a timing (drive start timing) to actually start drive of the focus lens L105 to obtain the defocus amount as a target defocus amount calculated at steps C1006 and C1007. This embodiment defines this drive start timing by using a delay time from (that is, on a basis of) the start of the above-mentioned first communication. Alternatively, the drive start timing may be defined on a basis of a charge accumulation start timing of the image sensor C101 for producing the image signal or on a basis of an output timing of the vertical synchronizing signal.

At step C1009, the camera microcomputer C106 calculates an arrival determination criterion timing that serves as a criterion for determining whether or not the drive of the focus lens L105 is able to be completed before start of the charge accumulation for obtaining the target defocus amount, when the focus lens L105 is driven from the drive start timing calculated at step C1008. This embodiment defines this arrival determination criterion timing by using a delay time from (that is, on a basis of) the start of the above-mentioned first communication. Alternatively, the arrival determination criterion timing may be defined on the basis of the charge accumulation start timing of the image sensor C101 for producing the image signal or on the basis of the output timing of the vertical synchronizing signal.

At step C1010, the camera microcomputer C106 sets a next control state to the infinity stop state.

At step C1011, the camera microcomputer C106 acquires the focus signal to store it as a focus signal when the focus lens L105 was stopped at a close distance side position. That is, the camera microcomputer C106 stores this acquired focus signal as a focus signal produced from an image signal accumulated when the focus lens L105 was located at a position stored at previous step C1023. In the example of FIG. 11, when the current VD is the VD (4), the focus signal acquirable here is produced from an image signal accumulated when the VD was a VD (2) at which the focus lens L105 was stopped at the close distance side position.

At step C1012, the camera microcomputer C106 determines whether the result of the previous arrival prediction received at step C1003 shows that "arrival (movement) is achievable" or "arrival is not achievable". Specifically, the camera microcomputer C106 determines whether or not the focus lens L105 is predicted to be able to arrive at the target position corresponding to the target defocus amount before the arrival determination criterion timing calculated at step C1009 (or, in other words, within a predetermined allowable time period based on the arrival determination criterion timing). In other words, the camera microcomputer C106 determines whether or not the focus lens L105 is predicted to be able to arrive at the target position corresponding to the target defocus amount within a predetermined time period. For example, when information on the result of the arrival prediction sent from the lens microcomputer L106 at a timing of an arrival prediction (4) shows that the arrival is achievable, the focus lens L105 is predicted to be able to arrive at the target position before start of charge accumulation for producing the focus signal at the VD (4). The start of charge accumulation for producing the focus signal is not necessarily limited to start of charge accumulation for producing a frame in which that charge accumulation is performed. For example, the camera microcomputer C106 may set the arrival determination criterion timing such that whether or not the focus lens L105 can arrive at the target position before a predetermined timing within a charge accumulating period for a first line of the frame. Moreover, the camera microcomputer C106 may change the arrival determination criterion timing depending on a position of a focus detection area in an imaging frame.

When the information on the result of the arrival prediction sent from the lens microcomputer L106 at the timing of the arrival prediction (4) shows that the arrival is not achievable, the focus lens L105 is predicted to be unable to arrive at the target position before the start of charge accumulation for producing the focus signal at the VD (4).

If the result of the arrival prediction shows that the focus lens L105 is able to arrive at the target position before the arrival determination criterion timing (that is, within the predetermined allowable time period from the arrival determination criterion timing), the camera microcomputer C106 proceeds to step C1013. If not (that is, if the result of the arrival prediction shows that the focus lens L105 is unable to arrive at the target position before the arrival determination criterion timing), the camera microcomputer C106 proceeds to step C1025.

When receiving the information showing that the arrival is not achievable, a next acquirable focus signal has a high possibility of providing an insufficient defocus amount, so that it is necessary to delay a period of the TVAF control in order to prevent erroneous operations. Thus, the camera microcomputer C106 proceeds to step C1025 without progressing the TVAF control (reciprocating operation). That is, the camera microcomputer C106 restricts the progression of the TVAF control. For example, when receiving, at the arrival prediction (4) (that is, by the first communication at the VD (4)), the information showing that the arrival is not achievable, the camera microcomputer C106 does not send a drive instruction to drive the focus lens L105 in a close distance direction, at a timing of a target defocus amount (6) (that is, by the second communication at a VD (5)).

The camera microcomputer C106 sends to the lens microcomputer L106, at the target defocus amount (6), a same value of the image plane amplitude amount as that in the previous second communication and an image plane center movement amount of 0. Then, when receiving, by the next first communication (that is, the first communication at the VD (5)), the information showing that the arrival is achievable, the camera microcomputer C106 sends the drive instruction to drive the focus lens L105 in the close distance direction by the second communication at a VD (6).

Figure 11:
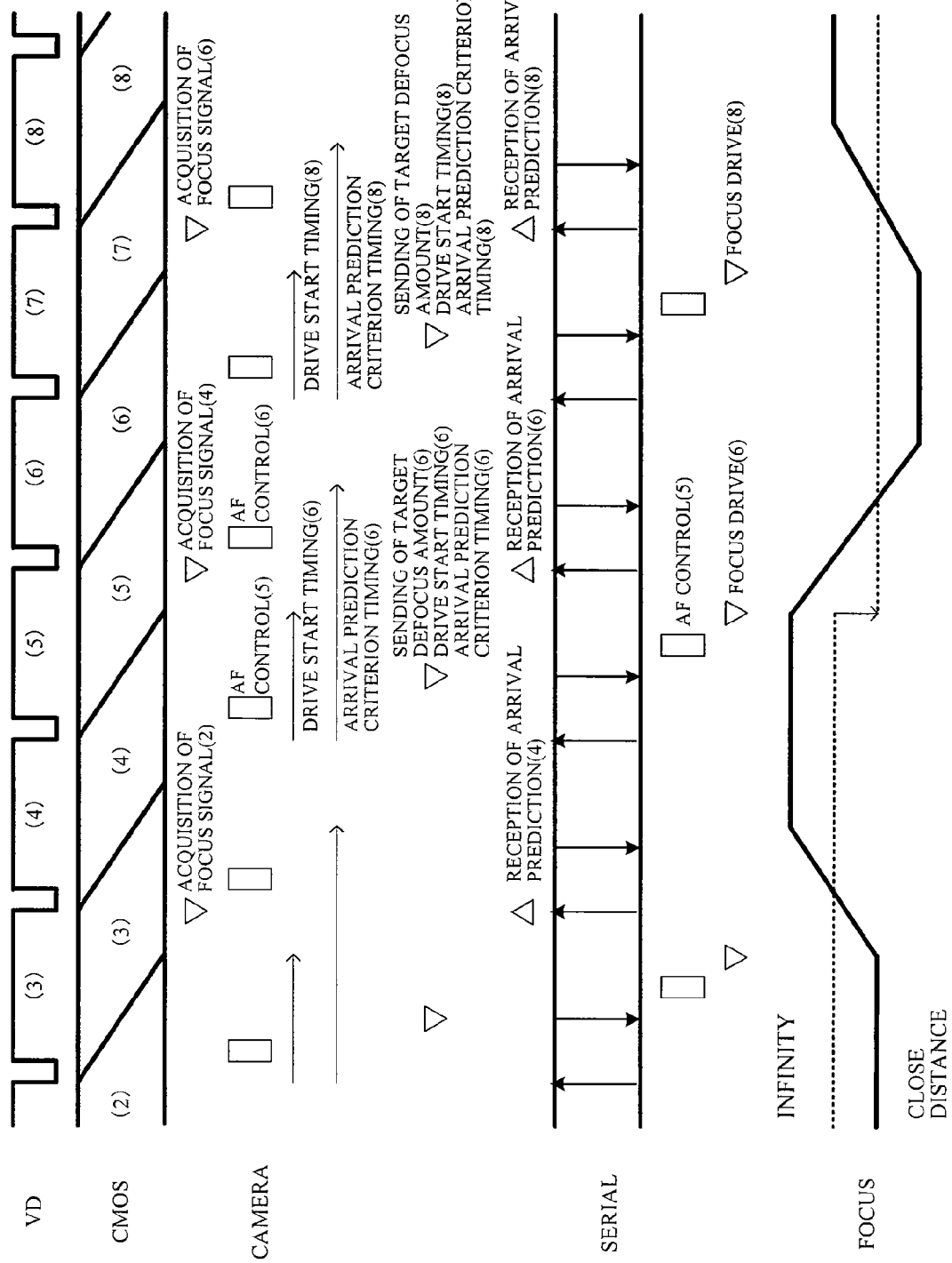
FIG. 11 is a timing chart of the TVAF control in Embodiment 1.

FIG. 11 shows the case where the information sent from the lens microcomputer L106 at the arrival prediction (4) (that is, the first communication at the VD (4)) shows that the arrival is achievable. Thus, the camera microcomputer C106 sends by the second communication at the VD (5) a drive instruction (target defocus amount (6)) to drive the focus lens L105 in the close distance direction.

At step C1013, the camera microcomputer C106 regards the focus lens L105 as having arrived at the target position and stores the current position of the focus lens L105. The camera microcomputer C106 correlates the focus lens position stored here to a focus signal to be acquired at step C1021 described later.

At step C1014, the camera microcomputer C106 sets a next control state to the close distance drive state.

At step C1015, the camera microcomputer C106 compares a level of the close distance side focus signal stored at previous step C1011 with that of the infinity side focus signal stored at previous step C1021. If the close distance side focus signal level is greater than the infinity side focus signal level, the camera microcomputer C106 proceeds to step C1016, if not, it proceeds to step C1017. In the example of FIG. 11, when the current VD is the VD (5), the camera microcomputer C106 compares levels of a focus signal (2) and a focus signal (0) (not shown).

At step C1016, the camera microcomputer C106 calculates a movement amount (image plane center movement amount) of the driving center position of the focus lens L105 in the close distance direction as a defocus amount on the image sensor plane. This defocus amount is set within the depth of focus.

At step C1017, the camera microcomputer C106 calculates a movement amount of the focus lens L105 (image plane amplitude amount) in the close distance direction with respect to the driving center position as a defocus amount on the image sensor surface. This defocus amount is also set within the depth of focus, as well as the image plane center movement amount.

At step C1018, the camera microcomputer C106 calculates a timing (drive start timing) to actually start the drive of the focus lens L105 to obtain the defocus amount as a target defocus amount calculated at steps C1016 and C1017. This embodiment defines this drive start timing by using a delay time from the start of the above-mentioned first communication. Alternatively, the drive start timing may be defined on the basis of the charge accumulation start timing of the image sensor C101 for producing the image signal or on the basis of an output timing of the vertical synchronizing signal.

At step C1019, the camera microcomputer C106 calculates an arrival determination criterion timing that serves as a criterion for determining whether or not the drive of the focus lens L105 may be completed before start of the charge accumulation for obtaining the target defocus amount when driving the focus lens L105 from the drive start timing calculated at step C1018. This embodiment defines this arrival determination criterion timing by using a delay time from the start of the above-mentioned first communication. Alternatively, the arrival determination criterion timing may be defined on the basis of the charge accumulation start timing of the image sensor C101 for producing the image signal or on the basis of the output timing of the vertical synchronizing signal.

At step C1020, the camera microcomputer C106 sets a next control state to the close distance stop state.

At step C1021, the camera microcomputer C106 acquires the focus signal to store it as a focus signal when the focus lens L105 was stopped at an infinity side position. That is, the camera microcomputer C106 stores this acquired focus signal as a focus signal produced from an image signal accumulated when the focus lens L105 was located at a position stored at previous step C1013. In the example of FIG. 11, when the current −VD is the VD (6), the focus signal acquirable at this step is produced from an image signal accumulated when the focus lens L105 was stopped at the infinity side position at the VD (4).

At step C1022, the camera microcomputer C106 determines whether the result of the previous arrival prediction received at step C1003 shows that the arrival is achievable or not achievable. Specifically, the camera microcomputer C106 determines whether or not the focus lens L105 is predicted to be able to arrive at the target position corresponding to the target defocus amount before the arrival determination criterion timing calculated at step C1019 (or within the predetermined allowable time period from the arrival determination criterion timing). In other words, the camera microcomputer C106 determines whether or not the focus lens L105 is predicted to be able to arrive at the target position corresponding to the target defocus amount within the predetermined time period. For example, when information on the result of the arrival prediction sent from the lens microcomputer L106 at a timing of an arrival prediction (6) shows that the arrival is achievable, the focus lens L105 is predicted to be able to arrive at the target position before start of charge accumulation for producing the focus signal at the VD (6).

When the information on the result of the arrival prediction sent from the lens microcomputer L106 at the timing of the arrival prediction (6) shows that the arrival is not achievable, the focus lens L105 is predicted to be unable to arrive at the target position before start of the charge accumulation for producing the focus signal at the VD (6).

If the result of the arrival prediction shows that the focus lens L105 is able to arrive at the target position before the arrival determination criterion timing (that is, within the predetermined allowable time period from the arrival determination criterion timing), the camera microcomputer C106 proceeds to step C1023. If not (that is, if the result of the arrival prediction shows that the focus lens L105 is unable to arrive at the target position before the arrival determination criterion timing), the camera microcomputer C106 proceeds to step C1025.

When receiving the information showing that the arrival is not achievable, a next acquirable focus signal has a high possibility of providing an insufficient defocus amount, it is necessary to delay the period of the TVAF control in order to prevent erroneous operations. Thus, the camera microcomputer C106 proceeds to step C1025 without progressing the TVAF control (reciprocating operation). That is, the camera microcomputer C106 restricts the progression of the TVAF control. For example, when receiving, at the arrival prediction (6) (that is, by the first communication at the VD (6)), the information showing that the arrival is not achievable, the camera microcomputer C106 does not send a drive instruction to drive the focus lens L105 in the infinity direction, at a timing of a target defocus amount (8) (that is, by the second communication at the VD (7)).

The camera microcomputer C106 sends, at the target defocus amount (8), a same value of the image plane amplitude amount as that in the previous second communication and an image plane center movement amount of 0. Then, when receiving, by the next first communication (that is, the first communication at the VD (7)), the information showing that the arrival is achievable, the camera microcomputer C106 sends the drive instruction to drive the focus lens L105 in the infinity direction by the second communication at the VD (8).

At step C1023, the camera microcomputer C106 regards the focus lens L105 as having arrived at the target position and stores the current position of the focus lens L105. The camera microcomputer C106 correlates the focus lens position stored here to a focus signal to be acquired at next step C1011.

At step C1024, the camera microcomputer C106 sets a next control state to the infinity drive state.

At step C1025, the camera microcomputer C106 sends the communication request to the lens microcomputer L106 again to start the second communication.

At step L1004, the lens microcomputer L106 determines whether or not it has received the communication request sent from the camera microcomputer C106 at step C1025. If having received the communication request, the lens microcomputer L106 proceeds to step L1005, and if not, it returns to step L1004 to wait for reception of the communication request.

At step C1026, the camera microcomputer C106 sends, when the second communication is started, information on the target defocus amount calculated at steps C1006 or C1007 or steps C1016 or C1017 to the lens microcomputer L106. Moreover, the camera microcomputer C106 sends information on the drive start timing calculated (specified) at step C1008 or C1018 and information on the arrival determination criterion timing calculated at step C1009 or C1019 to the lens microcomputer L106. In the example of FIG. 11, when a current VD is the VD (5), this process corresponds to a sending timing of the target defocus amount (6), a drive start timing (6) and an arrival determination criterion timing (6).

At step L1005, the lens microcomputer L106 receives the information on the target defocus amount, the drive start timing and the arrival determination criterion timing sent from the camera microcomputer C106 at step C1026.

At step L1006, the lens microcomputer L106 calculates an actual drive amount of the focus lens L105 on a basis of the target defocus amount received at step L1005 and on a basis of current focus sensitivity.

At step L1007, the lens microcomputer L106 calculates a drive speed of the focus lens L105 according to the actual drive amount calculated at step L1006.

At step L1008, the lens microcomputer L106 makes the arrival prediction for the focus lens L105 driven at the drive speed calculated at step L1007. That is, the lens microcomputer L106 predicts a timing at which the focus lens L105 is able to arrive at the target position. This arrival prediction corresponds to a prediction of whether or not the focus lens L105 is able to arrive at (in other words, able to be moved to) the target position before the arrival determination criterion timing that the lens microcomputer L106 has received by the second communication. The lens microcomputer L106 sends the result of the arrival prediction to the camera microcomputer C106 at next step L1003.

In this embodiment, the lens microcomputer L106 performs the above-mentioned fixed length packet communication, and a predetermined bit in a packet is used to show the result of the arrival prediction. For example, if a value of the predetermined bit is 1, the camera microcomputer C106 determines that the focus lens L105 is able to arrive at the target position before the arrival determination criterion timing. On the other hand, if the value of the predetermined bit is 0, the camera microcomputer C106 determines that the focus lens L105 is unable to arrive at the target position before the arrival determination criterion timing. In other words, the lens microcomputer L106 is capable of controlling a signal level of the predetermined bit in the packet in the fixed length packet communication. The lens microcomputer L106 determines, on a basis of the signal level, whether or not to cause the camera microcomputer C106 to restrict the progression of the focus control.

At step L1009, the lens microcomputer L106 determines, with reference to a value of the internal counter reset at step L1002, whether or not the delay time from the start of the first communication coincides with the drive start timing received at step L1005. If the delay time coincides with the drive start timing, the lens microcomputer L106 proceeds to step L1010, and if not, it proceeds to step L1009 to wait for coincidence thereof.

At step L1010, the lens microcomputer L106 sets the actual movement amount calculated at step L1006 and the drive speed calculated at step L1007 to the focus actuator L108 to actually cause the focus actuator L108 to drive the focus lens L105. In the example of FIG. 11, when the current VD is VD (5), the process at the step L1010 is performed at a timing of a focus drive (6).

As described above, this embodiment moves the focus lens L105 in the TVAF control while repeating "restart determination"→"reciprocating"→"peak-climbing drive"→"stop"→"reciprocating"→"restart determination", thereby keeping an in-focus state such that the focus signal always becomes maximum.

Moreover, in this embodiment there is sent, from the camera body to the lens unit, the target defocus amount, the drive start timing and the arrival determination criterion timing for the focus lens L105. In addition, in this embodiment there is sent, from the lens unit to the camera body, the result of the arrival prediction of the focus lens L105 to the target position corresponding to the target defocus amount. Then, the camera body progresses the TVAF control when receiving the information showing that the focus lens L105 is able to (approximately) arrive at the target position before the arrival determination criterion timing. On the other hand, the camera body restricts (delays) the TVAF control when receiving the information showing that the arrival is not achievable. Thereby, this enables recognition of the period of the TVAF control in advance, as well as lens-integrated cameras, even when lens units having mutually different optical characteristics are attached to the camera body, which makes it possible to perform good TVAF control.

Figure 2A:
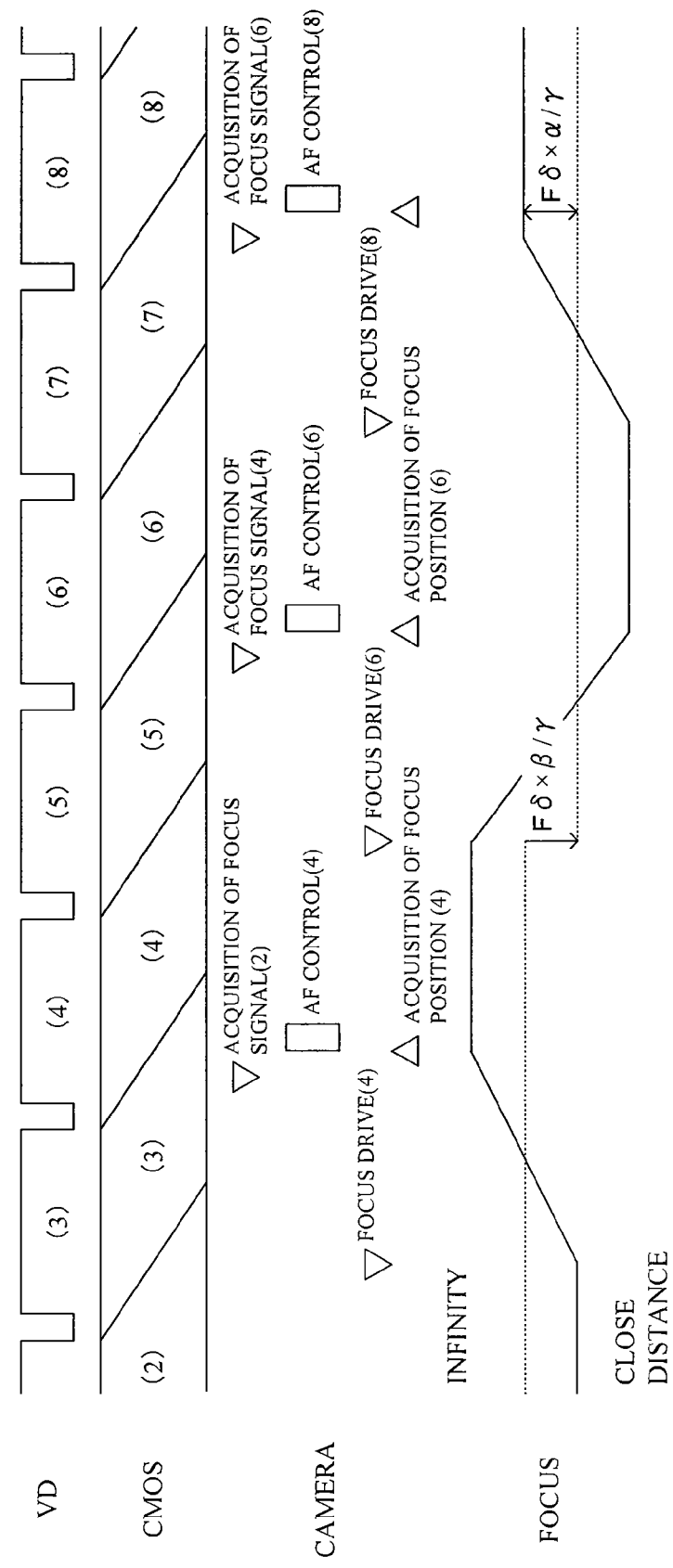
FIGS. 2A and 2B are timing charts of TVAF control in reference examples.

Description will be made of problems caused when the arrival prediction of the focus lens described in this embodiment is not performed, by using reference examples shown in FIGS. 2A and 2B. FIG. 2A shows TVAF control in a lens-integrated camera in which a lens unit is integrally provided to a camera body. The TVAF control in the lens-integrated camera decides target positions for moving a focus lens alternately in the close and infinity directions with respect to its driving center position. Moreover, the TVAF control in the lens-integrated camera moves the driving center position, based on a history of previous focus signals, as needed.

These target positions (drive amounts) and driving center position are generally decided as ratios of a depth of focus.

That is, the target position is necessary to be decided such that the ratio of a defocus amount on an image sensor surface to the depth of focus is constant and in consideration of the focus sensitivity. For example, in FIG. 2A, at an AF control (6), a focus signal (2) produced from a signal accumulated in the image sensor at a VD (2) is compared with a focus signal (4) produced from a signal accumulated in the image sensor at a VD (4). Then, a target position of the focus lens corresponding to a next VD (8) is decided based on a result of the comparison, and the focus lens is moved to the target position.

When a target defocus amount corresponds to a predetermined ratio $\alpha$ to the depth of focus $F\delta$ and the focus sensitivity is represented by $\gamma$, the target position of the focus lens can be expressed by $F\delta \times \alpha/\gamma$ with respect to the driving center position. Thus, a drive speed of the focus lens (focus drive speed) required to cause the focus lens to arrive at the target position at the VD (8) can be calculated.

In other words, whether or not the focus lens is able to arrive at the target position at the VD (8) with a specific focus drive speed can be determined in advance.

If determining that the arrival is not achievable, a next focus signal is produced by using, not the signal accumulated at the VD (8), but a signal accumulated at a VD (9). This makes it possible to mutually compare focus signals corresponding to focus lens positions sufficiently defocused in the close distance and infinity directions, which can avoid a problem of erroneous determination of an in-focus direction.

Figure 2B:
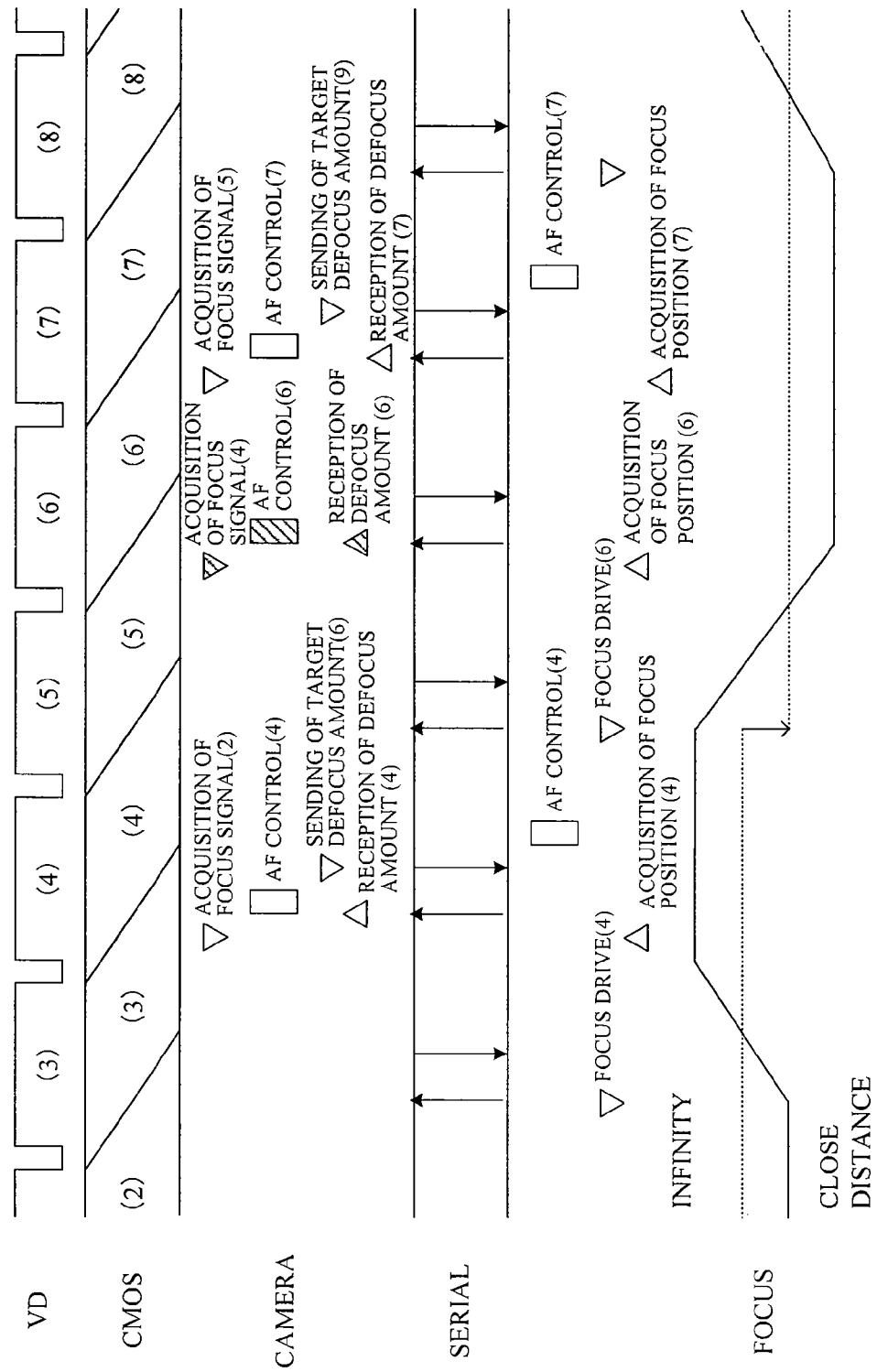

On the other hand, FIG. 2B shows TVAF control in a lens-interchangeable camera system. Basic operations for the TVAF control in the camera body are same as those of the above-described lens-integrated camera. The TVAF control in the lens-interchangeable camera system is different largely in that the lens unit attached to the camera body has unknown focus sensitivity. That is, although the defocus amount on the image sensor surface required to determine the in-focus direction can be calculated, an actual drive amount of the focus lens and time required for driving the focus lens by that drive amount are unknown. Therefore, the TVAF control cannot directly manage the focus lens position. Accordingly, the TVAF control cannot recognize the period of the TVAF control in advance like the lens-integrated camera, and thereby causes an unnecessary delay depending on timings of communication with the lens unit, which increases time until an in-focus state is obtained.

In the example of FIG. 2B, the target defocus amount decided at an AF control (4) in the camera body is sent to the lens unit in a coordinate system of an image plane movement amount. The lens unit converts the received target defocus amount into a target position at the AF control (4), and then actually moves the focus lens. Furthermore, the lens unit converts the actual movement amount of the focus lens into the coordinate system of the image plane movement amount, and sends it as the defocus amount to the camera body.

The drive of the focus lens has not been completed at a timing of a focus position acquisition (6). Therefore, the camera body determines that the arrival of the focus lens L105 at the target position before a VD (6) is not achievable on a basis of the defocus amount received from the lens unit. As a result, although the camera body originally should send within the VD (6) a target defocus amount (drive instruction in the infinity direction) produced at an AF control (6) to the lens unit, the camera body actually sends it thereto at a timing of a target defocus amount sending (9) within a VD (7). Thus, in the example of FIG. 2B, the camera body cannot determine that the arrival of the focus lens L105 at the target position before a VD (6) is achievable, which results in delay of the TVAF control.

Embodiment 2

Description will be made of a second embodiment (Embodiment 2) of the present invention. Embodiment 1 described the case where the camera body sends the information on the arrival determination criterion timing to the lens unit, and the lens unit predicts whether or not the focus lens is able to arrive at the target position before the arrival determination criterion timing and returns the result as the arrival prediction. This embodiment will describe a case of realizing same operations as those in Embodiment 1 but at different timings from those in Embodiment 1. The configuration of a lens-interchangeable camera system of this embodiment is same as that of Embodiment 1 shown in FIG. 1. Moreover, an overall flow of TVAF control in this embodiment is same as that in Embodiment 1 shown in FIG. 3.

Figure 4:
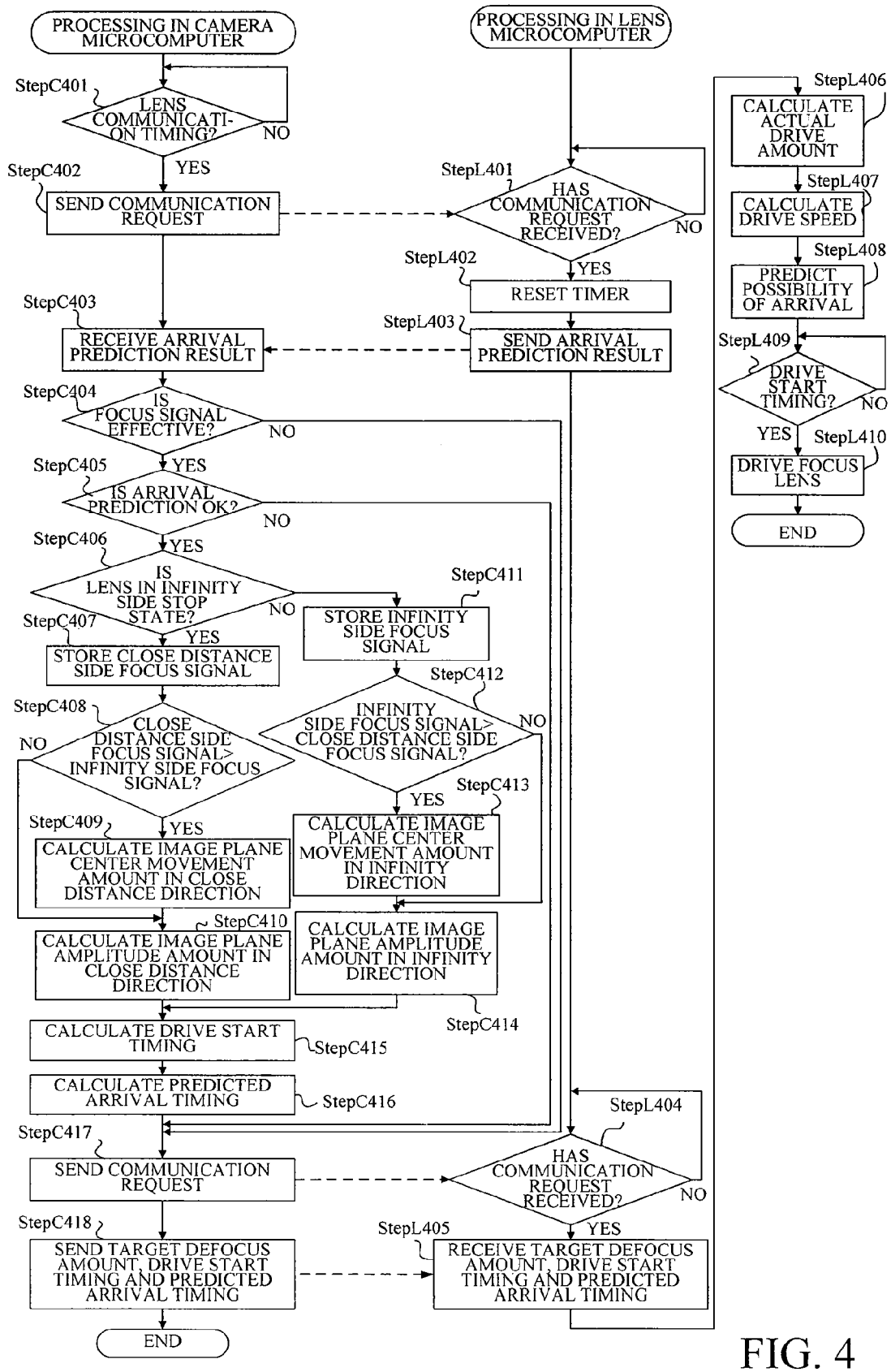
FIG. 4 is a flowchart of TVAF control in Embodiment 2 of the present invention.
Figure 5:
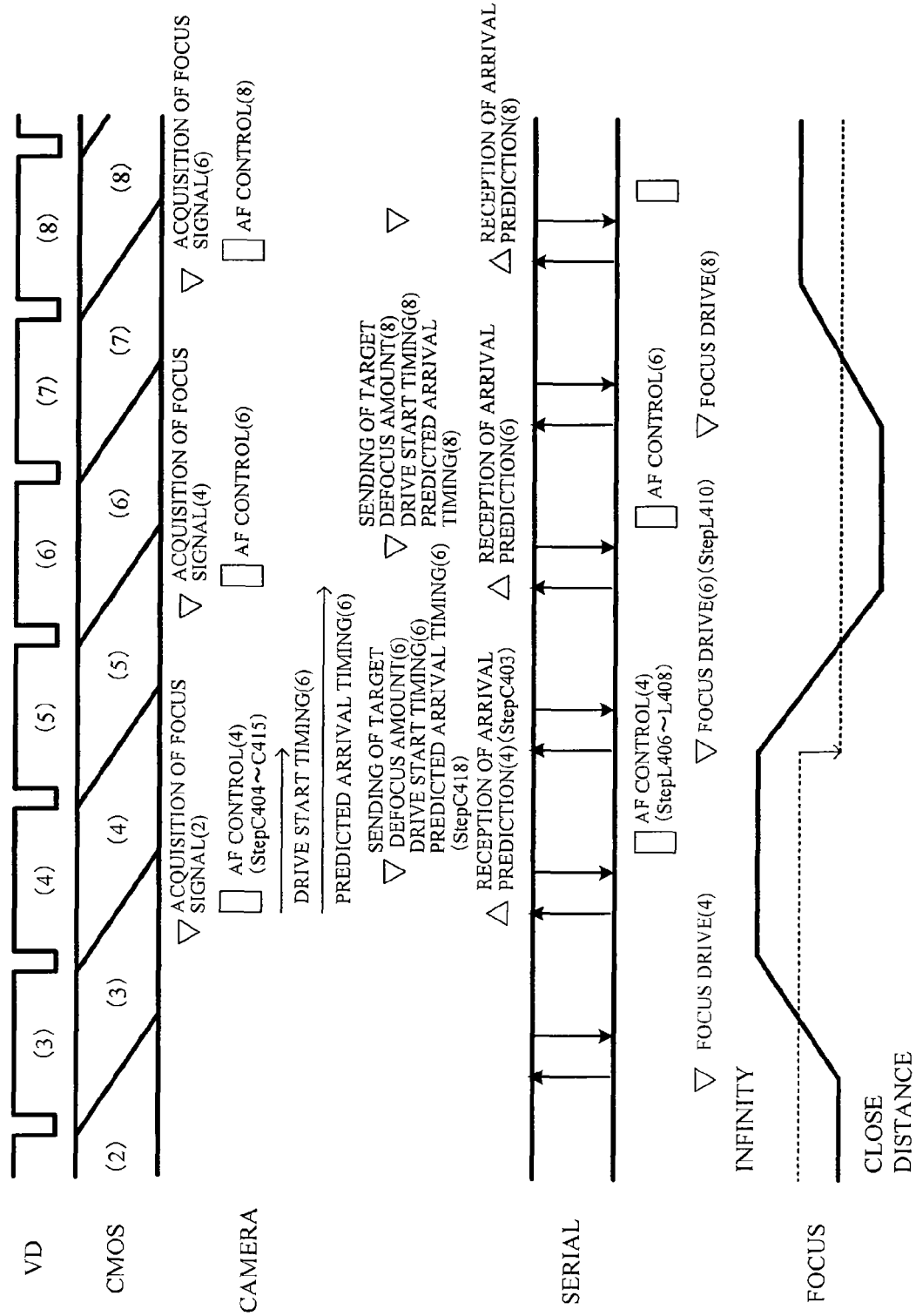
FIG. 5 is a timing chart of the TVAF control in Embodiment 2.

This embodiment mainly describes control performed by a camera microcomputer C106 and a lens microcomputer L106 in a reciprocating operation corresponding to the reciprocating operation performed at step 302 shown in FIG. 3, with reference to FIGS. 4 and 5.

In FIG. 4, at step C401, the camera microcomputer C106 determines whether or not a current timing with respect to a vertical synchronizing signal of an image (image signal) coincides with a predetermined timing at which communication with the lens microcomputer L106 (hereinafter referred to as "lens communication") is performed. If the current timing coincides with the predetermined timing (lens communication timing), the camera microcomputer C106 proceeds to step C402, and if not, it returns to step C401 to wait for the predetermined timing. This lens communication timing may be arbitrarily set on a basis of a start timing of charge accumulation in an image sensor C101 for producing the image signal, as long as a delay time of the lens communication timing with respect to the vertical synchronizing signal is kept constant.

At step C402, the camera microcomputer C106 sends a communication request to the lens microcomputer L106 to start the lens communication.

On the other hand, at step L401, the lens microcomputer L106 determines whether or not it has received the communication request sent from the camera microcomputer C106 at step C402. If having received the communication request, the lens microcomputer L106 proceeds to step L402, and if not, it returns to step L401 to wait for reception of the communication request.

At step L402, the lens microcomputer L106 resets its internal timer in response to start of a first communication, and then measures a delay time from the start of the first communication.

At step L403, the lens microcomputer L106 sends a result of an arrival prediction calculated in a previous process to the camera microcomputer C106. The communication here corresponds to part of the first communication. A detailed description of the arrival prediction will be made later with reference to step L408.

At step C403, the camera microcomputer C106 receives the result of the arrival prediction sent from the lens microcomputer L106 by the first communication at step L403. In an example of FIG. 5, when a current VD (vertical synchronizing signal) is a VD (4), this process corresponds to a receiving timing of an arrival prediction (4).

At step C404, the camera microcomputer C106 determines whether or not a focus signal that is currently acquirable is valid. That is, the camera microcomputer C106 determines whether the image signal from which the focus signal is produced was not accumulated while the focus lens L105 was being moved, but instead accumulated while the focus lens L105 was stopped at a previous target position. If the image signal is accumulated while the focus lens L105 was stopped, the camera microcomputer C106 proceeds to step C405, and if not, it proceeds to step C416. In the example of FIG. 5, when the current VD is a VD (4), a focus signal acquirable here is produced from the image signal accumulated at a VD (2). Since the focus lens L105 was stopped at a close distance side position at the VD (2), the focus signal produced from the image signal accumulated at the VD (2) is determined to be valid. On the other hand, when the current VD is the VD (5), a focus signal acquirable here is produced from the image signal accumulated at a VD (3). Since the focus lens L105 was being moved from an infinity side position toward the close distance side position at the VD (3), the focus signal produced from the image signal accumulated at the VD (3) is determined to be invalid.

At step C405, the camera microcomputer C106 determines whether or not the result of the previous arrival prediction received from the lens microcomputer L106 at step C403 shows that arrival is achievable (that is, whether or not it has received information showing that the focus lens L105 is able to arrive at the target position). If the arrival is achievable, the camera microcomputer C106 proceeds to step C406, and if not (that is, the arrival is not achievable), it proceeds to step C417. For example, when information on the result of the arrival prediction sent from the lens microcomputer L106 at a timing of an arrival prediction (4) shows that the arrival is achievable, the focus lens L105 is predicted to be able to arrive at the target position before start of charge accumulation for producing the focus signal at the VD (4). On the other hand, when the information on the result of the arrival prediction sent from the lens microcomputer L106 at the timing of the arrival prediction (4) shows that the arrival is not achievable, the focus lens L105 is predicted to be unable to arrive at the target position before the start of charge accumulation for producing the focus signal at the VD (4).

When receiving by the first communication the information showing that the arrival is not achievable, a next acquirable focus signal has a high possibility of providing an insufficient defocus amount since the focus lens L105 is also being currently moved, so that it is necessary to delay a period of the TVAF control in order to prevent erroneous operations. Thus, the camera microcomputer C106 proceeds to step C417 without progressing the TVAF control (reciprocating operation). That is, the camera microcomputer C106 restricts the progression of the TVAF control. For example, when receiving, at the timing of the arrival prediction (4) (that is, by the first communication at the VD (4)), the information showing that the arrival is not achievable, the camera microcomputer C106 does not send a drive instruction to drive the focus lens L105 in a close distance direction, at a timing of a target defocus amount (6). Then, when receiving, by the next first communication (that is, the first communication at the VD (5)), the information showing that the arrival is achievable, the camera microcomputer C106 sends the drive instruction to drive the focus lens L105 in the close distance direction by a second communication at the same VD (5).

At step C406, the camera microcomputer C106 determines whether or not the focus lens L105 is currently stopped at an infinity side position further than a driving center position thereof. If so, the camera microcomputer C106 proceeds to step C407, and if not, the camera microcomputer C106 proceeds to step C410. In the example of FIG. 5, when the current VD is the VD (4), the camera microcomputer C106 determines that the focus lens L105 is stopped at the infinity side position. When the current VD is a VD (6), the camera microcomputer C106 determines that the focus lens L105 is stopped at a close distance side position.

At step C407, the camera microcomputer C106 stores a close distance side focus signal. In the example of FIG. 5, when the current VD is the VD (4), the camera microcomputer C106 stores a focus signal (2) produced from the image signal accumulated at the VD (2) at which the focus lens L105 was stopped at the close distance side position.

At step C408, the camera microcomputer C106 compares a level of the close distance side focus signal stored at step C407 with that of an infinity side focus signal stored at previous step C410. If the close distance side focus signal level is greater than the infinity side focus signal level, the camera microcomputer C106 proceeds to step C409, and if not, it proceeds to step C413. In the example of FIG. 5, when the current VD is the VD (4), the camera microcomputer C106 compares levels of the focus signal (2) and a focus signal (0) (not shown).

At step C409, the camera microcomputer C106 calculates a movement amount (image plane center movement amount) of the driving center position of the focus lens L105 in the close distance direction as a defocus amount on the image sensor plane. This defocus amount is set within a depth of focus.

At step C410, the camera microcomputer C106 calculates a movement amount of the focus lens L105 (image plane amplitude amount) in the close distance direction with respect to the driving center position as a defocus amount on the image sensor surface. This defocus amount is also set within the depth of focus, as well as the image plane center movement amount.

At step C411, the camera microcomputer C106 stores the infinity side focus signal. In the example of FIG. 5, when the current VD is the VD (6), the camera microcomputer C106 stores a focus signal (4) produced from the image signal accumulated at the VD (4) at which the focus lens L105 was stopped at the infinity side position.

At step C412, the camera microcomputer C106 compares a level of the infinity side focus signal stored at step C411 with that of the close distance side focus signal stored at previous step C407. If the infinity side focus signal level is greater than the close distance side focus signal level, the camera microcomputer C106 proceeds to step C413, and if not, it proceeds to step C414. In the example of FIG. 5, when the current VD is the VD (6), the camera microcomputer C106 compares levels of the focus signal (4) and the focus signal (2).

At step C413, the camera microcomputer C106 calculates the movement amount (image plane center movement amount) of the driving center position of the focus lens L105 in the infinity direction as a defocus amount on the image sensor plane. This defocus amount is set within the depth of focus.

At step C414, the camera microcomputer C106 calculates a movement amount of the focus lens L105 (image plane amplitude amount) in the infinity direction with respect to the driving center position as a defocus amount on the image sensor surface. This defocus amount is also set within the depth of focus, as well as the image plane center movement amount.

At step C415, the camera microcomputer C106 calculates a timing (drive start timing) to actually start drive of the focus lens L105 to obtain the defocus amount as a target defocus amount calculated at steps C409, C410, C413 and C414. This embodiment defines this drive start timing by using a delay time from (that is, with respect to) the start of the above-mentioned first communication. Alternatively, the drive start timing may be defined with respect to a charge accumulation start timing of the image sensor C101 for producing the image signal or with respect to an output timing of the vertical synchronizing signal.

At step C416, the camera microcomputer C106 calculates a timing (predicted arrival timing) to determine whether or not, when the focus lens L105 is driven from the drive start timing calculated at step C415, the drive of the focus lens L105 is able to be completed before start of charge accumulation for obtaining the above-mentioned target defocus amount. The lens microcomputer L106 predicts whether or not the focus lens L105 is able to arrive at a target position corresponding to the target defocus amount at the predicted arrival timing calculated (specified) in this step.

This embodiment defines this predicted arrival timing by using the delay time from (that is, with respect to) the start of the above-mentioned first communication. Alternatively, the predicted arrival timing may be defined with respect to the charge accumulation start timing of the image sensor C101 for producing the image signal or with respect to the output timing of the vertical synchronizing signal.

At step C417, the camera microcomputer C106 sends the communication request to the lens microcomputer L106 again to start the second communication. At step L404, the lens microcomputer L106 determines whether or not it has received the communication request sent from the camera microcomputer C106 at step C417. If having received the communication request, the lens microcomputer L106 proceeds to step L405, if not, it returns to step L404 to wait for reception of the communication request.

At step C418, the camera microcomputer C106 sends, in response to the lens communication, information on the target defocus amount calculated at steps C409, C410, C413 and C414 to the lens microcomputer L106. The communication here corresponds to the above-mentioned second communication. Moreover, the camera microcomputer C106 further sends to the lens microcomputer L106 information on the drive start timing and the predicted arrival timing calculated (specified) at steps C415 and C416. In the example of FIG. 5, when the current VD is the VD (4), this process corresponds to a sending timing of the target defocus amount (6), a drive start timing (6) and a predicted arrival timing (6). If the result of the arrival prediction received at step C403 shows that the arrival is not achievable, the camera microcomputer C106 sends to the lens microcomputer L106, at the target defocus amount (6), a same value of the image plane amplitude amount as that in the previous second communication and an image plane center movement amount of 0.

At the lens unit, at step L405, the lets microcomputer L106 receives the information on the target defocus amount, the drive start timing and the predicted arrival timing sent from the camera microcomputer C106 at step C418.

At step L406, the lens microcomputer L106 calculates an actual drive amount (that is, the drive amount to drive the focus lens to a target position) of the focus lens L105 on a basis of the target defocus amount received at step L405 and current focus sensitivity.

At step L407, the lens microcomputer L106 calculates a drive speed of the focus lens L105 according to the actual drive amount calculated at step L406.

At step L408, the lens microcomputer L106 makes the arrival prediction for the focus lens L105 driven at the drive speed calculated at step L407 from the drive start timing received at step L405. Specifically, the lens microcomputer L106 predicts whether or not a predicted drive amount of the focus lens L105 from the drive start timing to the predicted arrival timing received at step L405 reaches the actual drive amount of the focus lens L105 calculated at step L406. Thus, the lens microcomputer L106 predicts whether or not the focus lens L105 is able to arrive at the target position. The lens microcomputer L106 sends the result of this arrival prediction to the camera microcomputer C106 by the first communication at next step L403.

In this embodiment, the lens microcomputer L106 performs fixed length packet communication, and a predetermined bit in a packet is used to show the result of the arrival prediction. For example, if a value of the predetermined bit is 1, the camera microcomputer C106 determines that the focus lens L105 is able to arrive at the target position. On the other hand, if the value of the predetermined bit is 0, the camera microcomputer C106 determines that the focus lens L105 is unable to arrive at the target position.

At step L409, the lens microcomputer L106 determines, with reference to a value of the internal counter reset at step L402, whether or not the delay time from the start of the first communication coincides with the drive start timing received at step L405. If the delay time coincides with the drive start timing, the lens microcomputer L106 proceeds to step L410, and if not, it proceeds to step L409 to wait for coincidence thereof.

At step L410, the lens microcomputer L106 sets the actual movement amount calculated at step L406 and the drive speed calculated at step L407 to a focus actuator L108 to actually cause the focus actuator L108 to drive the focus lens L105. In the example of FIG. 5, when the current VD is the VD (4), the process here is performed at a timing of a focus drive (6).

As described above, this embodiment moves the focus lens L105 in the TVAF control while repeating "restart determination"→"reciprocating"→"peak-climbing drive"→"stop"→"reciprocating"→"restart determination", thereby keeping an in-focus state such that the focus signal always becomes maximum.

Moreover, in this embodiment, the target defocus amount, the drive start timing and the predicted arrival timing for the focus lens L105 are sent from the camera body to the lens unit. In addition, in this embodiment, the result of the arrival prediction of the focus lens L105 to the target position corresponding to the target defocus amount is sent from the lens unit to the camera body. Then, the camera body progresses the TVAF control when receiving information showing that the arrival is achievable. On the other hand, the camera body restricts (delays) the TVAF control when receiving information showing that the arrival is not achievable. Thereby, this embodiment enables recognition of the period of the TVAF control in advance which makes it possible to perform good TVAF control even when lens units having mutually different optical characteristics are attached to the camera body. Thus, this embodiment allows TVAF control in an lens-interchangeable camera that is as effective as that used in a conventional TVAF lens-integrated camera.

Embodiment 3

Description will now be made of a third embodiment (Embodiment 3) of the present invention. This embodiment will describe a case where a camera body sends information on a timing of defocus amount prediction to a lens unit, and the lens unit predicts an actual drive amount of a focus lens at the defocus amount prediction timing and converts a result of the defocus amount prediction into a defocus amount on an image sensor surface for returning to the camera body. A configuration of a lens-interchangeable camera system of this embodiment is same as that of Embodiment 1 shown in FIG. 1. Moreover, an overall flow of TVAF control in this embodiment is same as that in Embodiment 1 shown in FIG. 3.

Figure 6:
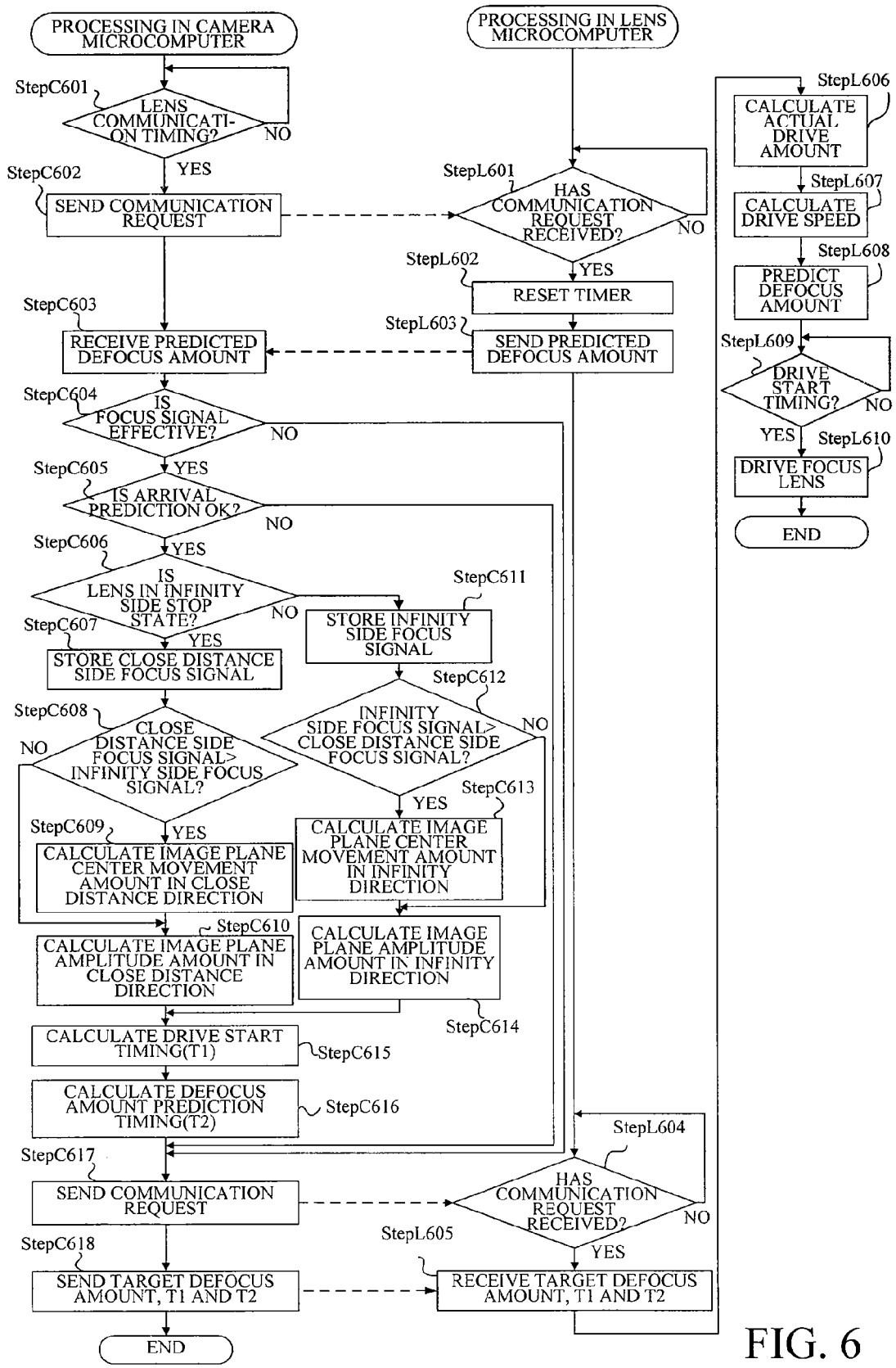
FIG. 6 is a flowchart of TVAF control in Embodiment 3 of the present invention.
Figure 7:
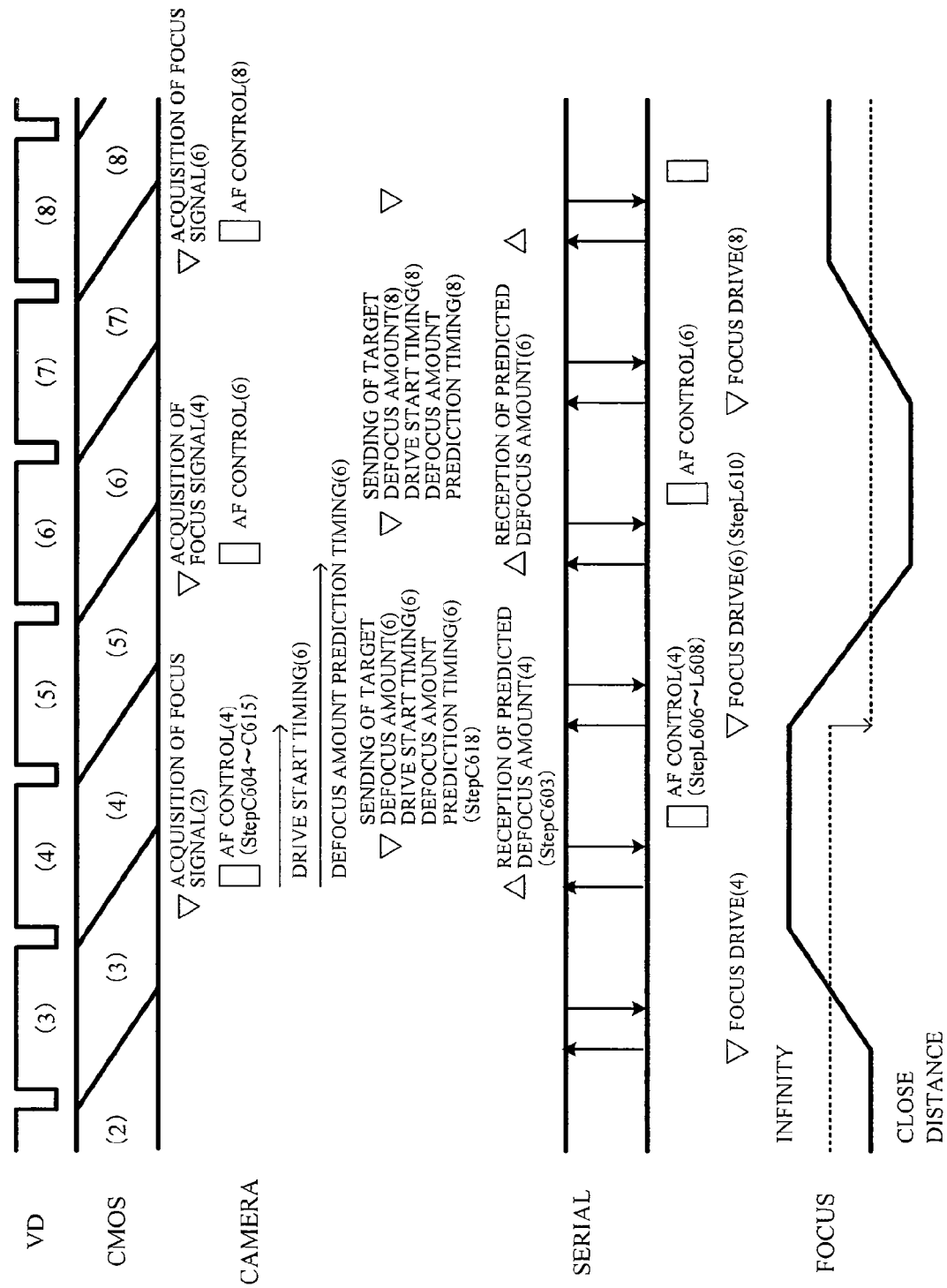
FIG. 7 is a timing chart of the TVAF control in Embodiment 3.

This embodiment mainly describes control performed by a camera microcomputer C106 and a lens microcomputer L106 in a reciprocating operation corresponding to the reciprocating operation performed at step 302 shown in FIG. 3, with reference to FIGS. 6 and 7.

In FIG. 6, at step C601, the camera microcomputer C106 determines whether or not a current timing with respect to a vertical synchronizing signal of an image (image signal) coincides with a predetermined timing at which a first communication (lens communication) with the lens microcomputer L106 is performed. If the current timing coincides with the predetermined timing (first communication timing), the camera microcomputer C106 proceeds to step C602, and if not, it returns to step C601 to wait for the predetermined timing. This first communication timing may be arbitrarily set on a basis of a start timing of charge accumulation in an image sensor C101 for producing the image signal, as long as a delay time of the first communication timing with respect to the vertical synchronizing signal is kept constant.

At step C602, the camera microcomputer C106 sends a communication request to the lens microcomputer L106 to start the first communication.

On the other hand, at step L601, the lens microcomputer L106 determines whether or not it has received the communication request sent from the camera microcomputer C106 at step C602. If having received the communication request, the lens microcomputer L106 proceeds to step L602, and if not, it returns to step L601 to wait for reception of the communication request.

At step L602, the lens microcomputer L106 resets its internal timer in response to start of the first communication, and then measures a delay time from the start of the first communication.

At step L603, the lens microcomputer L106 sends a result of the defocus amount prediction calculated in a previous process to the camera microcomputer C106. The communication here corresponds to part of the first communication. A detailed description of the defocus amount prediction will be made later, in particular when describing step L608.

Considering now the steps performed by the camera, at step C603, the camera microcomputer C106 receives the result of the defocus amount prediction sent from the lens microcomputer L106 by the first communication at step L603. In an example of FIG. 7, when a current VD (vertical synchronizing signal) is VD (4), this process corresponds to a receiving timing of a defocus amount prediction (4).

At step C604, the camera microcomputer C106 determines whether or not a focus signal that is currently acquirable is valid. That is, the camera microcomputer C106 determines whether the image signal from which the focus signal is produced was not accumulated while the focus lens L105 was being moved, but accumulated while the focus lens L105 was stopped at a previous target position. If the image signal was accumulated while the focus lens L105 was stopped, the camera microcomputer C106 proceeds to step C605, and if not, it proceeds to step C616. In the example of FIG. 7, when the current VD is the VD (4), a focus signal acquirable here is produced from the image signal accumulated at a VD (2). Since the focus lens L105 was stopped at a close distance side position at the VD (2), the focus signal produced from the image signal accumulated at the VD (2) is determined to be valid. On the other hand, when the current VD is a VD (5), a focus signal acquirable here is produced from the image signal accumulated at a VD (3). Since the focus lens L105 was being moved from an infinity side position toward the close distance side position at the VD (3), the focus signal produced from the image signal accumulated at the VD (3) is determined to be invalid.

At step C605, the camera microcomputer C106 determines whether or not a ratio of the result of the previous defocus amount prediction received at step C603 to a target defocus amount sent at previous step C618 (described later) is equal to or greater than a predetermined ratio. This determination corresponds to a determination of whether or not the focus lens L105 is predicted to be able to substantially arrive at a target position corresponding to the target defocus amount. If the ratio of the result of the defocus amount prediction to the target defocus amount is equal to or greater than the predetermined ratio (that is, if receiving information shows that the arrival of the focus lens L105 at the target position is achievable), the camera microcomputer C106 proceeds to step C606. If not (that is, if receiving information shows that the arrival of the focus lens L105 at the target position is not achievable), the camera microcomputer C106 proceeds to step C617. For example, when the information sent from the lens microcomputer L106 at a timing of an arrival prediction (4) shows that the arrival is achievable, the focus lens L105 is predicted to be able to arrive at the target position before start of charge accumulation for producing the focus signal at the VD (4). On the other hand, when the information sent from the lens microcomputer L106 at the timing of the arrival prediction (4) shows that the arrival is not achievable, the focus lens L105 is predicted to be unable to arrive at the target position before the start of charge accumulation for producing the focus signal at the VD (4).

When receiving by the first communication the information showing that the arrival is not achievable, a next acquirable focus signal has a high possibility of providing an insufficient defocus amount since the focus lens L105 is also being currently moved, so that it is necessary to delay a period of the TVAF control in order to prevent erroneous operations. Thus, the camera microcomputer C106 proceeds to step C617 without progressing the TVAF control (reciprocating operation). That is, the camera microcomputer C106 restricts the progression of the TVAF control. For example, when receiving, at the timing of the arrival prediction (4) (that is, by the first communication at the VD (4)), the information showing that the arrival is not achievable, the camera microcomputer C106 does not send a drive instruction to drive the focus lens L105 in a close distance direction, at a timing of a target defocus amount (6). Then, when receiving, by the next first communication (that is, the first communication at the VD (5)), the information showing that the arrival is achievable, the camera microcomputer C106 sends the drive instruction to drive the focus lens L105 in the close distance direction by a second communication at the same VD (5).

At step C606, the camera microcomputer C106 determines whether or not the focus lens L105 is currently stopped at an infinity side position further than a driving center position thereof. If so, the camera microcomputer C106 proceeds to step C607, and if not, the camera microcomputer C106 proceeds to step C610. In the example of FIG. 7, when the current VD is the VD (4), the camera microcomputer C106 determines that the focus lens L105 is stopped at the infinity side position. When the current VD is a VD (6), the camera microcomputer C106 determines that the focus lens L105 is stopped at a close distance side position.

At step C607, the camera microcomputer C106 stores a close distance side focus signal. In the example of FIG. 7, when the current VD is the VD (4), the camera microcomputer C106 stores a focus signal (2) produced from the image signal accumulated at the VD (2) at which the focus lens L105 was stopped at the close distance side position.

At step C608, the camera microcomputer C106 compares a level of the close distance side focus signal stored at step C607 with that of an infinity side focus signal stored at previous step C610 (described later). If the close distance side focus signal level is greater than the infinity side focus signal level, the camera microcomputer C106 proceeds to step C609, and if not, it proceeds to step C613. In the example of FIG. 7, when the current VD is the VD (4), the camera microcomputer C106 compares levels of the focus signal (2) and a focus signal (0) (not shown).

At step C609, the camera microcomputer C106 calculates a movement amount (image plane center movement amount) of a driving center position of the focus lens L105 in the close distance direction as a defocus amount on the image sensor plane. This defocus amount is set within a depth of focus.

At step C610, the camera microcomputer C106 calculates a movement amount of the focus lens L105 (image plane amplitude amount) in the close distance direction with respect to the driving center position as a defocus amount on the image sensor surface. This defocus amount is also set within the depth of focus, as well as the image plane center movement amount.

At step C611, the camera microcomputer C106 stores the infinity side focus signal. In the example of FIG. 7, when the current VD is the VD (6), the camera microcomputer C106 stores a focus signal (4) produced from the image signal accumulated at the VD (4) at which the focus lens L105 was stopped at the infinity side position.

At step C612, the camera microcomputer C106 compares a level of the infinity side focus signal stored at step C611 with that of the close distance side focus signal stored at previous step C607. If the infinity side focus signal level is greater than the close distance side focus signal level, the camera microcomputer C106 proceeds to step C613, and if not, it proceeds to step C614. In the example of FIG. 7, when the current VD is the VD (6), the camera microcomputer C106 compares levels of the focus signal (4) and the focus signal (2).

At step C613, the camera microcomputer C106 calculates the movement amount (image plane center movement amount) of the driving center position of the focus lens L105 in the infinity direction as a defocus amount on the image sensor plane. This defocus amount is set within the depth of focus.

At step C614, the camera microcomputer C106 calculates a movement amount of the focus lens L105 (image plane amplitude amount) in the infinity direction with respect to the driving center position as a defocus amount on the image sensor surface. This defocus amount is also set within the depth of focus, as well as the image plane center movement amount.

At step C615, the camera microcomputer C106 calculates a timing (drive start timing) to actually start drive of the focus lens L105 to obtain the defocus amount as a target defocus amount calculated at steps C609, C610, C613 and C614. This embodiment defines this drive start timing by using a delay time from (that is, with respect to) the start of the above-mentioned first communication. Alternatively, the drive start timing may be defined with respect to a charge accumulation start timing of the image sensor C101 for producing the image signal or with respect to an output timing of the vertical synchronizing signal.

At step C616, the camera microcomputer C106 calculates a timing (defocus amount prediction timing) as a criterion timing to determine whether or not, when the focus lens L105 is driven from the drive start timing calculated at step C615, the drive of the focus lens L105 is completed before start of charge accumulation for obtaining the above-mentioned target defocus amount. The lens microcomputer L106 predicts an actual drive amount of the focus lens L105 at the defocus amount prediction timing calculated here, and converts the predicted actual drive amount into a defocus amount on the image sensor surface. In this embodiment this defocus amount prediction timing is defined by using the delay time from (that is, on the basis of) the start of the above-mentioned first communication. Alternatively, the defocus amount prediction timing may be defined on the basis of the charge accumulation start timing of the image sensor C101 for producing the image signal or on the basis of the output timing of the vertical synchronizing signal.

At step C617, the camera microcomputer C106 sends the communication request to the lens microcomputer L106 again to start the second communication.

At step L604, the lens microcomputer L106 determines whether or not it has received the communication request sent from the camera microcomputer C106 at step C617. If having received the communication request, the lens microcomputer L106 proceeds to step L605, if not, it returns to step L604 to wait for reception of the communication request.

At step C618, the camera microcomputer C106 sends, in response to the second communication, information on the target defocus amount calculated at steps C609, C610, C613 and C614 to the lens microcomputer L106. Moreover, the camera microcomputer C106 further sends to the lens microcomputer L106 information on the drive start timing and the defocus amount prediction timing calculated (specified) at steps C615 and C616. In the example of FIG. 7, when the current VD is the VD (4), this process corresponds to a sending timing of the target defocus amount (6), a drive start timing (6) and a defocus amount prediction timing (6). If the result of the arrival prediction received at step C603 shows that the arrival is not achievable, the camera microcomputer C106 sends to the lens microcomputer L106, at the target defocus amount (6), a same value of the image plane amplitude amount as that in the previous second communication and an image plane center movement amount of 0.

At step L605, the lens microcomputer L106 receives the information on the target defocus amount, the drive start timing and the defocus amount prediction timing sent from the camera microcomputer C106 at step C618.

At step L606, the lens microcomputer L106 calculates an actual drive amount of the focus lens L105 on a basis of the target defocus amount received at step L605 and current focus sensitivity.

At step L607, the lens microcomputer L106 calculates a drive speed of the focus lens L105 according to the actual drive amount calculated at step L606.

At step L608, the lens microcomputer L106 makes the defocus amount prediction for the focus lens L105 driven at the drive speed calculated at step L607 from the drive start timing received at step L605. Specifically, the lens microcomputer L106 predicts a drive amount of the focus lens L105 from the drive start timing to the defocus amount prediction timing received at step L605, and converts the predicted drive amount into a defocus amount on the image sensor surface. This defocus amount prediction corresponds to prediction of whether or not arrival of the focus lens L105 at the target position is achievable. The lens microcomputer L106 sends the result of this defocus amount prediction to the camera microcomputer C106 by the first communication at next step L603.

In this embodiment, the lens microcomputer L106 performs fixed length packet communication, and a predetermined bit in a packet is used to show the result of the prediction of whether or not the arrival is achievable. For example, if a value of the predetermined bit is 1, the camera microcomputer C106 determines that the focus lens L105 is able to arrive at the target position. On the other hand, if the value of the predetermined bit is 0, the camera microcomputer C106 determines that the focus lens L105 is unable to arrive at the target position.

At step L609, the lens microcomputer L106 determines, with reference to a value of the internal counter reset at step L602, whether or not the delay time from the start of the first communication coincides with the drive start timing received at step L605. If the delay time coincides with the drive start timing, the lens microcomputer L106 proceeds to step L610, and if not, it proceeds to step L609 to wait for coincidence thereof.

At step L610, the lens microcomputer L106 sets the actual movement amount calculated at step L606 and the drive speed calculated at step L607 to a focus actuator L108 to actually cause the focus actuator L108 to drive the focus lens L105. In the example of FIG. 7, when the current VD is the VD (4), the process here is performed at a timing of a focus drive (6).

As described above, this embodiment moves the focus lens L105 in the TVAF control while repeating "restart determination"→"reciprocating"→"peak-climbing drive"→"stop"→"reciprocating"→"restart determination", thereby keeping an in-focus state such that the focus signal always becomes maximum.

Moreover, in this embodiment, the target defocus amount, the drive start timing and the defocus amount prediction timing for the focus lens L105 are sent from the camera body to the lens unit. In addition, in this embodiment, the result of the defocus amount prediction with respect to the target defocus amount is sent from the lens unit to the camera body. Then, the camera body progresses the TVAF control when receiving information showing that the arrival is achievable, that is, the focus lens L105 is able to (approximately) arrive at the target position corresponding to the target defocus amount. However, the camera body restricts (delays) the TVAF control when receiving information showing that the arrival is not achievable. Thereby, this embodiment enables recognition of the period of the TVAF control in advance even when lens units having mutually different optical characteristics are attached to the camera body. This which makes it possible to perform TVAF control in a lens-interchangeable camera which is as good as the control in a lens-integrated camera.

Embodiment 4

Description will be made of a fourth embodiment (Embodiment 4) of the present invention. This embodiment will describe a case where a lens unit sends, to a camera body, information on a result of prediction of an arrival timing at which a focus lens is able to arrive at a target position.

A configuration of a lens-interchangeable camera system of this embodiment is same as that of Embodiment 1 shown in FIG. 1. Moreover, an overall flow of TVAF control in this embodiment is same as that in Embodiment 1 shown in FIG. 3.

Figure 8:
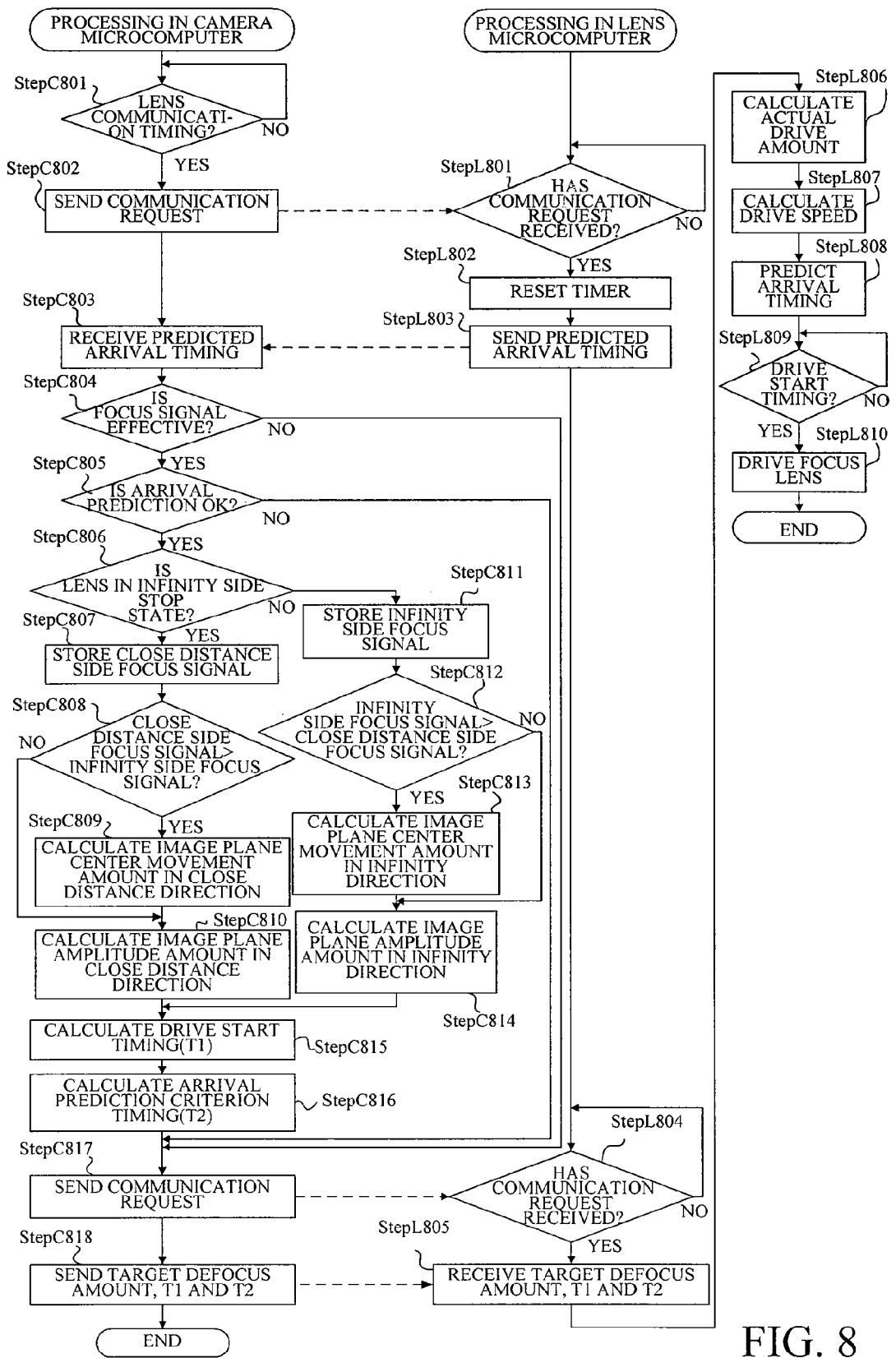
FIG. 8 is a flowchart of TVAF control in Embodiment 4 of the present invention.
Figure 9:
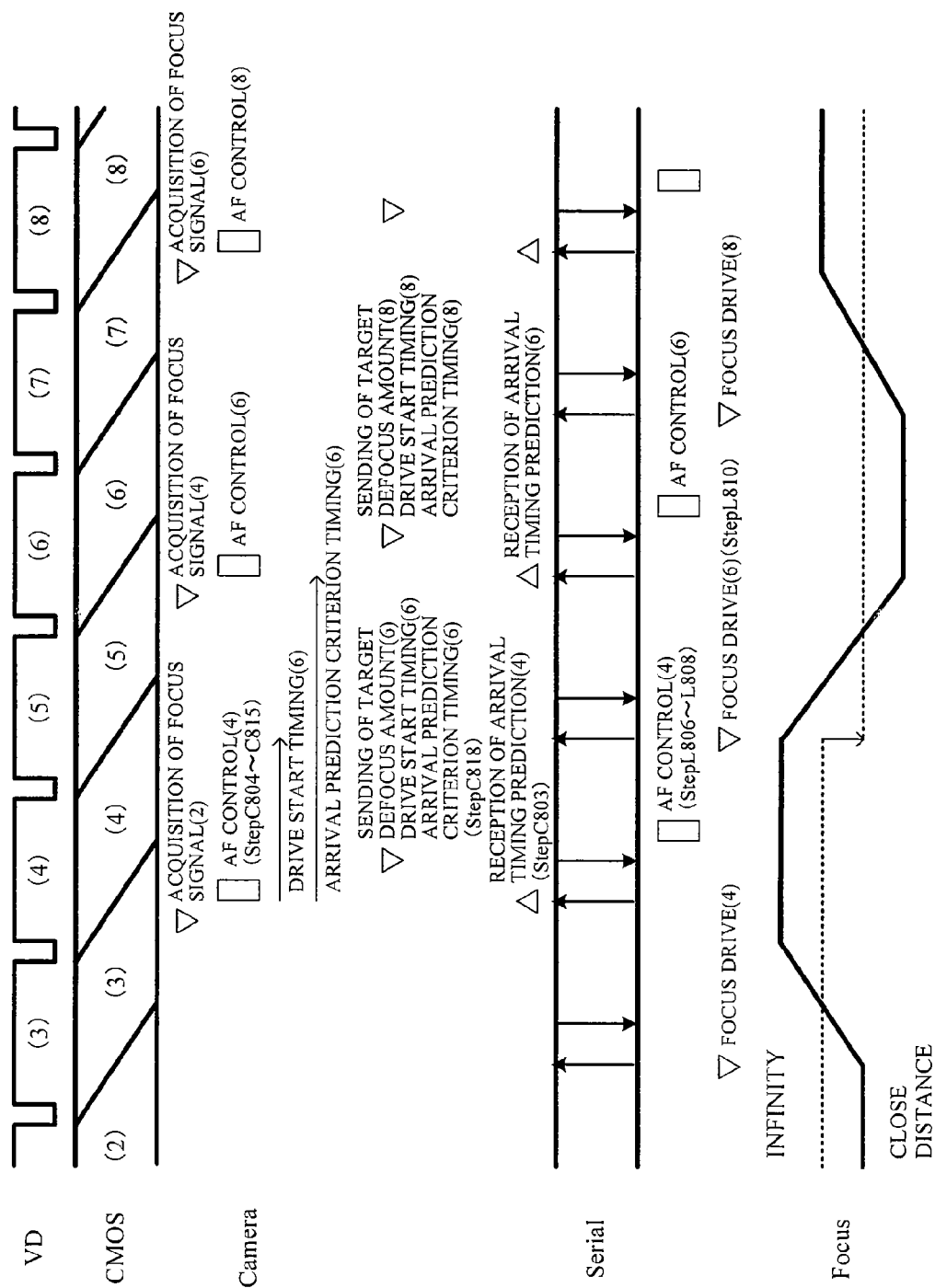
FIG. 9 is a timing chart of the TVAF control in Embodiment 4.

This embodiment mainly describes control performed by a camera microcomputer C106 and a lens microcomputer L106 in a reciprocating operation corresponding to the reciprocating operation performed at step 302 shown in FIG. 3, with reference to FIGS. 8 and 9.

In FIG. 8, at step C801, the camera microcomputer C106 determines whether or not a current timing with respect to a vertical synchronizing signal of an image (image signal) coincides with predetermined timing at which a first communication with the lens microcomputer L106 is performed. If the current timing coincides with the predetermined timing (first communication timing), the camera microcomputer C106 proceeds to step C802, and if not, it returns to step C801 to wait for the predetermined timing. This first communication timing may be arbitrarily set with respect to a start timing of charge accumulation in an image sensor C101 for producing the image signal, as long as a delay time of the first communication timing with respect to the vertical synchronizing signal is kept constant.

At step C802, the camera microcomputer C106 sends a communication request to the lens microcomputer L106 to start the first communication.

On the other hand, at step L801, the lens microcomputer L106 determines whether or not it has received the communication request sent from the camera microcomputer C106 at step C802. If having received the communication request, the lens microcomputer L106 proceeds to step L802, and if not, it returns to step L801 to wait for reception of the communication request.

At step L802, the lens microcomputer L106 resets its internal timer in response to start of the first communication, and then measures a delay time from the start of the first communication.

At step L803, the lens microcomputer L106 sends a result of the prediction of the arrival timing calculated in a previous process to the camera microcomputer C106. The communication here corresponds to part of the first communication. A detailed description of the arrival timing prediction will be made at step L808 later.

On the other hand, at step C803, the camera microcomputer C106 receives the result of the arrival timing prediction sent from the lens microcomputer 1106 by the first communication at step L803. In an example of FIG. 9, when a current VD (vertical synchronizing signal) is a VD (4), this process corresponds to receiving timing of an arrival timing prediction (4).

At step C804, the camera microcomputer C106 determines whether or not a focus signal that is currently acquirable is valid. That is, the camera microcomputer C106 determines whether the image signal from which the focus signal is produced was not accumulated while the focus lens L105 was being moved, but accumulated while the focus lens L105 was stopped at a previous target position. If the image signal was accumulated while the focus lens L105 was stopped, the camera microcomputer C106 proceeds to step C805, and if not, it proceeds to step C816. In the example of FIG. 9, when the current VD is the VD (4), a focus signal acquirable here is produced from the image signal accumulated at a VD (2). Since the focus lens L105 was stopped at a close distance side position at the VD (2), the focus signal produced from the image signal accumulated at the VD (2) is determined to be valid. On the other hand, when the current VD is a VD (5), a focus signal acquirable here is produced from the image signal accumulated at a VD (3). Since the focus lens L105 was being moved from an infinity side position toward the close distance side position at the VD (3), the focus signal produced from the image signal accumulated at the VD (3) is determined to be invalid.

At step C805, the camera microcomputer C106 determines whether or not the result of the previous arrival timing prediction received at step C803 is within a predetermined allowable time range with respect to an arrival determination criterion timing calculated at previous step C816 (described later). This determination corresponds to a determination of whether or not the focus lens L105 is predicted to be able to substantially arrive at a target position corresponding to a target defocus amount within a predetermined time period.

If the result of the arrival timing prediction is within the predetermined time period with respect to the arrival determination criterion timing (that is, if receiving information showing that the arrival of the focus lens L105 at the target position is achievable), the camera microcomputer C106 proceeds to step C806. If not (that is, if receiving information shows that the arrival of the focus lens L105 at the target position is not achievable), the camera microcomputer C106 proceeds to step C817. For example, when the information sent from the lens microcomputer L106 at a timing of an arrival prediction (4) shows that the arrival is achievable, the focus lens L105 is predicted to be able to arrive at the target position before start of charge accumulation for producing the focus signal at the VD (4). On the other hand, when the information sent from the lens microcomputer L106 at the timing of the arrival prediction (4) shows that the arrival is not achievable, the focus lens L105 is predicted to be unable to arrive at the target position before the start of charge accumulation for producing the focus signal at the VD (4).

When receiving by the first communication information showing that the arrival is not achievable, a next acquirable focus signal has a high probability of providing an insufficient defocus amount since the focus lens L105 is also being currently moved, so that it is necessary to delay a period of the TVAF control in order to prevent erroneous operations. Thus, the camera microcomputer C106 proceeds to step C817 without progressing the TVAF control (reciprocating operation). That is, the camera microcomputer C106 restricts the progression of the TVAF control. For example, when receiving, at the timing of the arrival prediction (4) (that is, by the first communication at the VD (4)), the information showing that the arrival is not achievable, the camera microcomputer C106 does not send a drive instruction to drive the focus lens L105 in a close distance direction, at a timing of a target defocus amount (6). Then, when receiving, by the next first communication (that is, the first communication at the VD (5)), the information showing that the arrival is achievable, the camera microcomputer C106 sends the drive instruction to drive the focus lens L105 in the close distance direction by a second communication at the same VD (5).

At step C806, the camera microcomputer C106 determines whether or not the focus lens L105 is currently stopped at an infinity side position further than a driving center position thereof. If so, the camera microcomputer C106 proceeds to step C807, and if not, the camera microcomputer C106 proceeds to step C810. In the example of FIG. 9, when the current VD is the VD (4), the camera microcomputer C106 determines that the focus lens L105 is stopped at the infinity side position. When the current VD is a VD (6), the camera microcomputer C106 determines that the focus lens L105 is stopped at a close distance side position.

At step C807, the camera microcomputer C106 stores a close distance side focus signal. In the example of FIG. 9, when the current VD is the VD (4), the camera microcomputer C106 stores a focus signal (2) produced from the image signal accumulated at the VD (2) at which the focus lens L105 was stopped at the close distance side position.

At step C808, the camera microcomputer C106 compares a level of the close distance side focus signal stored at step C807 with that of an infinity side focus signal stored at previous step C810 (described later). If the close distance side focus signal level is greater than the infinity side focus signal level, the camera microcomputer C106 proceeds to step C809, and if not, it proceeds to step C813. In the example of FIG. 9, when the current VD is the VD (4), the camera microcomputer C106 compares levels of the focus signal (2) and a focus signal (0) (not shown).

At step C809, the camera microcomputer C106 calculates a movement amount (image plane center movement amount) of a driving center position of the focus lens L105 in the close distance direction as a defocus amount on the image sensor plane. This defocus amount is set within a depth of focus.

At step C810, the camera microcomputer C106 calculates a movement amount of the focus lens L105 (image plane amplitude amount) in the close distance direction with respect to the driving center position as a defocus amount on the image sensor surface. This defocus amount is also set within the depth of focus, as well as the image plane center movement amount.

At step C811, the camera microcomputer C106 stores the infinity side focus signal. In the example of FIG. 9, when the current VD is the VD (6), the camera microcomputer C106 stores a focus signal (4) produced from the image signal accumulated at the VD (4) at which the focus lens L105 was stopped on the infinity side position.

At step C812, the camera microcomputer C106 compares a level of the infinity side focus signal stored at step C811 with that of the close distance side focus signal stored at previous step C807. If the infinity side focus signal level is greater than the close distance side focus signal level, the camera microcomputer C106 proceeds to step C813, and if not, it proceeds to step C814. In the example of FIG. 9, when the current VD is the VD (6), the camera microcomputer C106 compares levels of the focus signal (4) and the focus signal (2).

At step C813, the camera microcomputer C106 calculates the movement amount (image plane center movement amount) of the driving center position of the focus lens L105 in the infinity direction as a defocus amount on the image sensor plane. This defocus amount is set within the depth of focus.

At step C814, the camera microcomputer C106 calculates a movement amount of the focus lens L105 (image plane amplitude amount) in the infinity direction with respect to the driving center position as a defocus amount on the image sensor surface. This defocus amount is also set within the depth of focus, as well as the image plane center movement amount.

At step C815, the camera microcomputer C106 calculates a timing (drive start timing) to actually start drive of the focus lens L105 to obtain the defocus amount as a target defocus amount calculated at steps C809, C810, C813 and C814. This embodiment defines this drive start timing by using a delay time from (that is, with respect to) the start of the above-mentioned first communication. Alternatively, the drive start timing may be defined with respect to a charge accumulation start timing of the image sensor C101 for producing the image signal or with respect to an output timing of the vertical synchronizing signal.

At step C816, the camera microcomputer C106 calculates the arrival determination criterion timing that serves as a criterion for determining whether or not the drive of the focus lens L105 is able to be completed before start of charge accumulation for obtaining the target defocus amount when driving the focus lens L105 from the drive start timing calculated at step C815. This embodiment defines this arrival determination criterion timing by using a delay time from the start of the above-mentioned first communication. Alternatively, the arrival determination criterion timing may be defined on the basis of the charge accumulation start timing of the image sensor C101 for producing the image signal or on the basis of the output timing of the vertical synchronizing signal.

At step C817, the camera microcomputer C106 sends the communication request to the lens microcomputer L106 again to start the second communication.

At step L804, the lens microcomputer L106 determines whether or not it has received the communication request sent from the camera microcomputer C106 at step C817. If having received the communication request, the lens microcomputer L106 proceeds to step L805, if not, it returns to step L804 to wait for reception of the communication request.

At step C818, the camera microcomputer C106 sends, in response to the second communication, information on the target defocus amount calculated at steps C809, C810, C813 and C814 to the lens microcomputer L106. Moreover, the camera microcomputer C106 further sends to the lens microcomputer L106 information on the drive start timing and the arrival determination criterion timing calculated (specified) at steps C815 and C816. In the example of FIG. 9, when the current VD is the VD (4), this process corresponds to a sending timing of the target defocus amount (6), a drive start timing (6) and an arrival determination criterion timing (6). If the result of the arrival prediction received at step C803 shows that the arrival is not achievable, the camera microcomputer C106 sends to the lens microcomputer L106, at the target defocus amount (6), a same value of the image plane amplitude amount as that in the previous second communication and an image plane center movement amount of 0.

At step L805, the lens microcomputer L106 receives the information on the target defocus amount, the drive start timing and the arrival determination criterion timing sent from the camera microcomputer C106 at step C818.

At step L806, the lens microcomputer L106 calculates an actual drive amount of the focus lens L105 on a basis of the target defocus amount received at step L805 and current focus sensitivity.

At step L807, the lens microcomputer L106 calculates a drive speed of the focus lens L105 according to the actual drive amount calculated at step L806.

At step L808, the lens microcomputer L106 makes the defocus amount prediction for the focus lens L105 driven at the drive speed calculated at step L807. Specifically, the lens microcomputer L106 predicts a timing at which the focus lens L105 is able to arrive at the target position. The lens microcomputer L106 sends the result of this arrival timing prediction to the camera microcomputer C106 by the first communication at next step L803.

In this embodiment, the lens microcomputer L106 performs a fixed length packet communication, and a predetermined bit in a packet is used to show the result of the arrival timing prediction.

At step L809, the lens microcomputer L106 determines, with reference to a value of the internal counter reset at step L802, whether or not the delay time from the start of the first communication coincides with the drive start timing received at step L805. If the delay time coincides with the drive start timing, the lens microcomputer L106 proceeds to step L810, and if not, it proceeds to step L809 to wait for coincidence thereof.

At step L810, the lens microcomputer L106 sets the actual movement amount calculated at step L806 and the drive speed calculated at step L807 to a focus actuator L108 to actually cause the focus actuator L108 to drive the focus lens L105. In the example of FIG. 9, when the current VD is the VD (4), the process here is performed at a timing of a focus drive (6).

As described above, this embodiment moves the focus lens L105 in the TVAF control while repeating "restart determination"→"reciprocating"→"peak-climbing drive"→"stop"→"reciprocating"→"restart determination", thereby keeping an in-focus state such that the focus signal always becomes maximum.

Moreover, in this embodiment the target defocus amount, the drive start timing and the arrival determination criterion timing for the focus lens L105 are sent from the camera body to the lens unit. In addition, in this embodiment, the result of the arrival timing prediction of the focus lens L105 to the target position corresponding to the target defocus amount is sent from the lens unit to the camera body. Then, the camera body progresses the TVAF control when receiving the information showing that the arrival is achievable, that is, the focus lens L105 is able to (approximately) arrive at the target position. On the other hand, the camera body restricts (delays) the TVAF control when receiving the information showing that the arrival is not achievable. Thereby, this embodiment enables recognition of the period of the TVAF control in advance even when lens units having mutually different optical characteristics are attached to the camera body. This makes it possible to perform good TVAF control in a lens-interchangeable camera which is as good as that with a lens-integrated camera.

In addition to the above-described embodiments, alternative embodiments of the present invention includes a case of installing software (computer program) capable of realizing the functions described in each of the above-described embodiments in an image pickup apparatus and an interchangeable lens each of which is provided with a computer from a storage (recording) medium directly or through wired or wireless communication to cause the computer to execute the software.

While the present invention has been described with reference to particular embodiments, it is to be understood that the invention is not limited to those embodiments. The scope of the following claims is to be accorded the broadest interpretation so as to encompass all such modifications and equivalent structures and functions.

This application claims the benefit of Japanese Patent Application Nos. 2012-004563, filed on Jan. 13, 2012, and 2012-276293, filed on Dec. 18, 2012, which are hereby incorporated by reference herein in their entirety.

What is claimed is:

1. An image pickup apparatus to which a lens unit provided with an image taking optical system including a focus lens is detachably mountable, the apparatus comprising:
an image sensor operable to perform charge accumulation and generate an image signal; and
a controller configured to control communication with a mounted lens unit and to generate a drive instruction to drive the focus lens of the mounted lens unit on a basis of a focus signal generated by using the image signal, said focus signal indicating a focus state of the image taking optical system,
wherein a reciprocating operation of the focus lens is performed for determining an in-focus direction before a peak-climbing operation, to drive the focus lens in a direction in which the focus signal is increased, or determining an in-focus state after the peak-climbing operation,
wherein when the reciprocating operation of the focus lens is performed, the controller is configured to send information relating to a predetermined timing and the drive instruction to the lens unit, and receive, from the lens unit, a first signal indicating whether the focus lens is able to be moved by a movement amount based on the drive instruction to satisfy the predetermined timing, wherein the controller is further configured to:
(a) if the first signal indicates that the focus lens is able to be moved by the movement amount based on the drive instruction to satisfy the predetermined timing, generate the new drive instruction by using a focus signal generated based on charge accumulated in a first time period, and
(b) if the first signal indicates that the focus lens is not able to be moved by the movement amount based on the drive instruction, generate the new drive instruction by using a focus signal generated based on charge accumulated in a second time period after the first time period, and
wherein the predetermined timing is timing relating to starting of the charge accumulation for generating the focus signal.

2. The image pickup apparatus according to claim 1, wherein the controller is further configured to change the focus signal to be used for generating the drive instruction depending on indication of the first signal.

3. The image pickup apparatus according to claim 1, wherein the controller is further configured to control a stopping time period to stop the focus lens after completion of its movement based on the drive instruction.

4. The image pickup apparatus according to claim 3, wherein the controller is further configured to, when the first signal indicates that the focus lens is not able to be moved by the movement amount based on the drive instruction to satisfy the predetermined timing, control the stopping time period to be longer than when the first signal indicates that the focus lens is able to be moved by the movement amount based on the drive instruction.

5. The image pickup apparatus according to claim 1, wherein the drive instruction includes information relating to a start timing of the movement of the focus lens.

6. The image pickup apparatus according to claim 1, wherein the controller is operable to communicate with the lens unit in synchronization with a vertical synchronizing signal, and performs a first communication in synchronization with the vertical synchronizing signal and then performs a second communication before a next first communication in synchronization with a next vertical synchronizing signal, and
wherein the controller (a) sends in the second communication the information relating to the predetermined timing and the drive instruction to the lens unit and (b) receives in the next first communication the first signal corresponding to the information sent to the lens unit in the last second communication.

7. The image pickup apparatus according to claim 6, wherein the information relating to the predetermined timing is expressed as a time with respect to start of the first communication.

8. The image pickup apparatus according to claim 6, wherein the drive instruction includes information relating to a start timing of the movement of the focus lens, the information being expressed by a time with respect to start of the first communication.

9. The image pickup apparatus according to claim 1, wherein the controller is further configured to generate the drive instruction of the focus lens on a basis of the focus signal generated by using charge accumulated within a time period in which the focus lens is stopped.

10. The image pickup apparatus according to claim 1, wherein the controller is configured to determine whether the focus lens is able to be moved by the movement amount based on the drive instruction, depending on a signal level of the first signal.

11. A lens unit detachably mountable to an image pickup apparatus having an image sensor operable to perform charge accumulation and generate an image signal, the lens unit comprising:
an image taking optical system including a focus lens; and
a lens controller configured to receive a drive instruction for the focus lens from the image pickup apparatus and to control drive of the focus lens on a basis of the drive instruction, said drive instruction is generated on a basis of a focus signal generated by using the image signal,
wherein a reciprocating operation of the focus lens is performed for determining an in-focus direction before a peak-climbing operation, to drive the focus lens in a direction in which the focus signal is increased, or determining an in-focus state after the peak-climbing operation,
wherein when the reciprocating operation of the focus lens is performed, the lens controller is configured to receive information relating to a predetermined timing and the drive instruction from the image pickup apparatus, and send, to the image pickup apparatus, a first signal indicating whether the focus lens is able to be moved by a movement amount based on the driving instruction to satisfy the predetermined timing, (a) if the first signal indicates that the focus lens is able to be moved by the movement amount based on the drive instruction to satisfy the predetermined timing, the new drive instruction is generated by using a focus signal generated based on charge accumulated in a first time period, and (b) if the first signal indicates that the focus lens is not able to be moved by the movement amount based on the drive instruction, the new drive instruction is generated by using a focus signal generated based on charge accumulated in a second time period after the first time period, and
wherein the predetermined timing is timing relating to starting of the charge accumulation for generating the focus signal.

12. The lens unit according to claim 11, wherein the lens controller is further configured to, when the first signal indicates that the focus lens is not able to be moved by the movement amount based on the drive instruction to satisfy the predetermined timing, send to the image pickup apparatus, a signal of a different level from that when the first signal indicates that the focus lens is able to be moved by the movement amount based on the drive instruction.

13. The lens unit according to claim 11, wherein the lens controller is further configured to stop the focus lens after completion of its movement based on the drive instruction.

14. The lens unit according to claim 11, wherein the lens controller is further configured to, when sending to the image pickup apparatus the first signal indicating that the focus lens is not able to be moved by the movement amount based on the drive instruction to satisfy the predetermined timing, set a longer stopping time period to stop the focus lens after completion of its movement based on the drive instruction than the stopping time period set when sending thereto the first signal indicating that the focus lens is able to be moved by the movement amount based on the drive instruction.

15. The lens unit according to claim 11, wherein the lens controller is further configured to control a start timing of the movement of the focus lens on a basis of the drive instruction.

16. The lens unit according to claim 11, wherein the lens controller is operable to communicate with the image pickup apparatus in synchronization with a vertical synchronizing signal, and performs a first communication in synchronization with the vertical synchronizing signal and then performs a second communication before a next first communication in synchronization with a next vertical synchronizing signal, and wherein the lens controller is further configured to (a) receive in the second communication the information relating to the predetermined timing and the drive instruction from the image pickup apparatus and (b) send in the next first communication the first signal corresponding to the information received from the image pickup apparatus in the last second communication.

17. The lens unit according to claim 16, wherein the information relating to the predetermined timing is expressed by a time on a basis of start of the first communication.

18. The lens unit according to claim 16, wherein the drive instruction includes information relating to a start timing of the movement of the focus lens, the information being expressed by a time with respect to start of the first communication.

19. The lens unit according to claim 11, wherein the lens controller is further configured to:
(a) make a prediction of whether or not the focus lens is able to be moved by the movement amount based on the drive instruction to satisfy the predetermined timing, and
(b) send to the image pickup apparatus, when making a prediction that focus lens is not able to be moved, a signal of a different level from that when making the prediction that the focus lens is able to be moved by the movement amount based on the drive instruction, as the first signal.

20. A lens unit detachably mountable to an image pickup apparatus having an image sensor operable to perform charge accumulation and generate an image signal, the lens unit comprising:

an image taking optical system including a focus lens; and
a lens controller configured to receive a drive instruction for the focus lens from the image pickup apparatus and to control drive of the focus lens on a basis of the drive instruction, said drive instruction is generated on a basis of a focus signal generated by using the image signal, wherein a reciprocating operation of the focus lens is performed for determining an in-focus direction before a peak-climbing operation, to drive the focus lens in a direction in which the focus signal is increased, or determining an in-focus state after the peak-climbing operation, wherein when the reciprocating operation of the focus lens is performed, the lens controller is configured to receive information relating to a predetermined timing and the drive instruction from the image pickup apparatus, and then send, to the image pickup apparatus, a signal of a predetermined level as a first signal when the focus lens is not able to be moved by a movement amount based on the driving instruction to satisfy the predetermined timing, and set a longer stopping time period to stop the focus lens after completion of its movement based on the drive instruction, when sending to the image pickup apparatus the signal of the predetermined level as the first signal, as compared with when sending thereto a signal of a level different from the predetermined level as the first signal,
(a) if the lens controller sends a signal of the level different from the predetermined level as the first signal, the new drive instruction is generated by using a focus signal generated based on charge accumulated in a first time period, and (b) if the lens controller sends a signal of the predetermined level as the first signal, the new drive instruction is generated by using a focus signal generated based on charge accumulated in a second time period after the first time period, and wherein the predetermined timing is timing relating to starting of the charge accumulation for generating the focus signal.

21. The lens unit according to claim 20,
wherein the lens controller is operable to communicate with the image pickup apparatus in synchronization with a vertical synchronizing signal and configured to receive the drive instruction of the focus lens and to control drive of the focus lens on a basis of the drive instruction, wherein when the reciprocating operation of the focus lens is performed, the lens controller is further configured to:

perform a first communication in synchronization with the vertical synchronizing signal and then perform a second communication before a next first communication in synchronization with a next vertical synchronizing signal, receive in the second communication the information relating to the predetermined timing and the drive instruction from the image pickup apparatus, and send in the next first communication, in a case that the focus lens is not able to be moved by the movement amount based on the drive instruction to satisfy the predetermined timing, a signal of the predetermined level as a first signal to the image pickup apparatus.

22. A method of controlling an image pickup apparatus to which a lens unit provided with an image taking optical system including a focus lens is detachably mountable and which is provided with an image sensor operable to perform charge accumulation and generate an image signal, the method comprising:

a controlling step of controlling communication with a mounted lens unit;
a focus signal generating step of generating a focus signal indicating a focus state of the image taking optical system by using the image signal; and
a drive instruction generating step of generating a drive instruction for the focus lens on a basis of the focus signal, wherein a reciprocating operation of the focus lens is performed for determining an in-focus direction before a peak-climbing operation, to drive the focus lens in a direction in which the focus signal is increased, or determining an in-focus state after the peak-climbing operation, wherein when the reciprocating operation of the focus lens is performed, in the controlling step, the method sends information relating to a predetermined timing and the drive instruction to the lens unit and receives, from the lens unit, a first signal indicating whether the focus lens is able to be moved by a movement amount based on the drive instruction to satisfy the predetermined timing, wherein in the drive instruction generating step,
(a) if the first signal indicates that the focus lens is able to be moved by the movement amount based on the drive instruction to satisfy the predetermined timing, the method generates the new drive instruction by using a focus signal generated based on charge accumulated in a first time period, and
(b) if the first signal indicates that the focus lens is not able to be moved by the movement amount based on the drive instruction, the method generates the new drive instruction by using a focus signal generated based on charge accumulated in a second time period after the first time period, and wherein the predetermined timing is timing relating to starting of the charge accumulation for generating the focus signal.

23. A method of controlling a lens unit provided with an image taking optical system including a focus lens and detachably mountable to an image pickup apparatus having an image sensor operable to perform charge accumulation and generate an image signal, the method comprising:

a receiving step of receiving a drive instruction for the focus lens from the image pickup apparatus;

a sending step of sending information to the image pickup apparatus; and a controlling step of controlling drive of the focus lens on a basis of the drive instruction, said drive instruction is generated on a basis of a focus signal generated by using the image signal, wherein a reciprocating operation of the focus lens is performed for determining an in-focus direction before a peak-climbing operation, to drive the focus lens in a direction in which the focus signal is increased, or determining an in-focus state after the peak-climbing operation, wherein when the reciprocating operation of the focus lens is performed, in the receiving step, the method receives information relating to a predetermined timing and the drive instruction from the image pickup apparatus, and in the sending step, the method sends, to the image pickup apparatus, a first signal indicating whether the focus lens is able to be moved by a movement amount based on the driving instruction to satisfy the predetermined timing, (a) if the first signal indicates that the focus lens is able to be moved by the movement amount based on the drive instruction to satisfy the predetermined timing, the new drive instruction is generated by using a focus signal generated based on charge accumulated in a first time period, and (b) if the first signal indicates that the focus lens is not able to be moved by the movement amount based on the drive instruction, the new drive instruction is generated by using a focus signal generated based on charge accumulated in a second time period after the first time period, and wherein the predetermined timing is timing relating to starting of the charge accumulation for generating the focus signal.

24. A method of controlling a lens unit provided with an image taking optical system including a focus lens and detachably mountable to an image pickup apparatus having an image sensor operable to perform charge accumulation and generate an image signal, the method comprising:

a receiving step of receiving a drive instruction for the focus lens from the image pickup apparatus;

a sending step of sending information to the image pickup apparatus; and a controlling step of controlling drive of the focus lens on a basis of the drive instruction, said drive instruction is generated on a basis of a focus signal generated by using the image signal, wherein a reciprocating operation of the focus lens is performed for determining an in-focus direction before a peak-climbing operation, to drive the focus lens in a direction in which the focus signal is increased, or determining an in-focus state after the peak-climbing operation, wherein when the reciprocating operation of the focus lens is performed, in the receiving step, the method receives information relating to a predetermined timing and the drive instruction from the image pickup apparatus, and in the sending step, the method sends, to the image pickup apparatus, a signal of a predetermined level as a first signal when the focus lens is not able to be moved by a movement amount based on the driving instruction to satisfy the predetermined timing, and wherein, in the controlling step, the method sets a longer stopping time period to stop the focus lens after completion of its movement based on the drive instruction when sending to the image pickup apparatus the signal of the predetermined level as the first signal, as compared with when sending thereto a signal of a level different from the predetermined level as the first signal, (a) if the lens controller sends a signal of the level different from the predetermined level as the first signal, the new drive instruction is generated by using a focus signal generated based on charge accumulated in a first time period, and (b) if the lens controller sends a signal of the predetermined level as the first signal, the new drive instruction is generated by using a focus signal generated based on charge accumulated in a second time period after the first time period, and wherein the predetermined timing is timing relating to starting of the charge accumulation for generating the focus signal.

25. The method of controlling a lens unit according to claim 24, wherein when the reciprocating operation of the focus lens is performed, the method performs a first communication in synchronization with a vertical synchronizing signal and then performing a second communication before a next first communication in synchronization with a next vertical synchronizing signal, wherein, in the receiving step, the method receives in the second communication the information relating to the predetermined timing and the drive instruction from the image pickup apparatus, wherein, in the sending step, the method sends, when the focus lens is not able to be moved by the movement amount based on the driving instruction to satisfy the predetermined timing, a signal of a predetermined level as a first signal to the image pickup apparatus in the next first communication.

26. A non-transitory machine readable medium containing program code which upon execution causes an image pickup apparatus to which a lens unit provided with an image taking optical system including a focus lens is detachably mountable and which is provided with an image sensor operable to perform charge accumulation and generate an image signal, to perform:

a focus signal generating step of generating a focus signal indicating a focus state of the image taking optical system by using the image signal;

a drive instruction generating step of generating a drive instruction for the focus lens on a basis of the focus signal; and a controlling step of controlling, when a reciprocating operation of the focus lens is performed, communication with the lens unit comprising sending information relating to a predetermined timing and the drive instruction to the lens unit and receiving, from the lens unit, a first signal indicating whether the focus lens is able to be moved by a movement amount based on the drive instruction to satisfy the predetermined timing, wherein in the drive instruction generating step,
(a) if the first signal indicates that the focus lens is able to be moved by the movement amount based on the drive instruction to satisfy the predetermined timing, the method generates the new drive instruction by using a focus signal generated based on charge accumulated in a first time period, and
(b) if the first signal indicates that the focus lens is not able to be moved by the movement amount based on the drive instruction, the method generates the new drive instruction by using a focus signal generated based on charge accumulated in a second time period after the first time period,
wherein the reciprocating operation of the focus lens is performed for determining an in-focus direction before a peak-climbing operation, to drive the focus lens in a direction in which the focus signal is increased, or determining an in-focus state after the peak-climbing operation, and
wherein the predetermined timing is timing relating to starting of the charge accumulation for generating the focus signal.

27. A non-transitory machine readable medium containing computer executable program code which upon execution causes a lens unit provided with an image taking optical system including a focus lens and detachably mountable to an image pickup apparatus having an image sensor operable to perform charge accumulation and generate an image signal, to perform:

a receiving step of receiving, when a reciprocating operation of the focus lens is performed, a predetermined timing and a drive instruction for the focus lens from the image pickup apparatus;
a controlling step of controlling drive of the focus lens on a basis of the drive instruction; and
a sending step of sending, to the image pickup apparatus, a first signal showing whether or not the focus lens is able to be moved by a movement amount based on the driving instruction to satisfy the predetermined timing, (a) if the first signal indicates that the focus lens is able to be moved by the movement amount based on the drive instruction to satisfy the predetermined timing, the new drive instruction is generated by using a focus signal generated based on charge accumulated in a first time period, and (b) if the first signal indicates that the focus lens is not able to be moved by the movement amount based on the drive instruction, the new drive instruction is generated by using a focus signal generated based on charge accumulated in a second time period after the first time period,
wherein the reciprocating operation of the focus lens is performed for determining an in-focus direction before a peak-climbing operation, to drive the focus lens in a direction in which the focus signal is increased, or determining an in-focus state after the peak-climbing operation, and
wherein the predetermined timing is timing relating to starting of the charge accumulation for generating the focus signal.

* * * * *